(12) United States Patent
Jain et al.

(10) Patent No.: US 12,051,227 B2
(45) Date of Patent: Jul. 30, 2024

(54) METHOD AND SYSTEM FOR SELECTING MARKER FOR MODIFYING A SCENE WITHIN AN AUGMENTED REALITY BASED COMPUTING ENVIRONMENT

(71) Applicant: SAMSUNG ELECTRONICS CO., LTD., Suwon-si (KR)

(72) Inventors: Ashima Jain, Noida (IN); Ruchika Saxena, Noida (IN); Maneesh Jain, Noida (IN); Sachin Dev Sharma, Noida (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 158 days.

(21) Appl. No.: 17/948,981

(22) Filed: Sep. 20, 2022

(65) Prior Publication Data

US 2023/0111356 A1   Apr. 13, 2023

Related U.S. Application Data

(63) Continuation of application No. PCT/KR2022/012668, filed on Aug. 24, 2022.

(30) Foreign Application Priority Data

Oct. 8, 2021   (IN) .............................. 202111046019

(51) Int. Cl.
*G06V 10/25*   (2022.01)
*G06T 19/00*   (2011.01)
(Continued)

(52) U.S. Cl.
CPC ............ *G06V 10/25* (2022.01); *G06T 19/006* (2013.01); *G06V 20/20* (2022.01); *G06V 20/63* (2022.01)

(58) Field of Classification Search
None
See application file for complete search history.

(56) References Cited

U.S. PATENT DOCUMENTS 9,536,251 B2   1/2017   Huang et al.
10,026,228 B2   7/2018   Yuen et al.
(Continued)

FOREIGN PATENT DOCUMENTS

CN   107895178 A   4/2018
CN   106095075 B   12/2019
(Continued)

OTHER PUBLICATIONS

Communication dated Aug. 9, 2023, issued by the India Intellectual Property Office in Indian Patent Application No. 202111046019.
(Continued)

*Primary Examiner* — Yi Wang
(74) *Attorney, Agent, or Firm* — Sughrue Mion, PLLC

(57) ABSTRACT

A method for selection of a marker in an augmented reality (AR) environment is provided. The method includes capturing a scene in the augmented reality environment; extracting a set of region of interest from the scene captured; identifying a text in the region of interest or from a document associated to the region of interest; determining a set of phrase-action pairs from the text; generating a representation of a set of region of interest and a representation of a set of phrase-action pairs; calculating inter model similarity using the set of region of interest and the set of phrase-action pairs in common embedding space; computing intra model similarity by comparing the extracted ROI with a generated ROI and the extracted phrase-action with generated phrase actions; and selecting a phrase-action-ROI tuple having the highest intra modal similarity as the marker.

15 Claims, 20 Drawing Sheets

(51) Int. Cl.
   *G06V 20/20*   (2022.01)
   *G06V 20/62*   (2022.01)

(56) References Cited

U.S. PATENT DOCUMENTS

| | | |
|---|---|---|
| 11,663,784 B2 | 5/2023 | Nigam et al. |
| 2014/0340423 A1 | 11/2014 | Taylor et al. |
| 2019/0163976 A1 | 5/2019 | Fu |
| 2020/0258144 A1 | 8/2020 | Chaturvedi et al. |
| 2020/0349188 A1 | 11/2020 | Ahrens et al. |
| 2021/0166031 A1 | 6/2021 | Bates et al. |
| 2021/0256365 A1 | 8/2021 | Wang et al. |

FOREIGN PATENT DOCUMENTS

| | | |
|---|---|---|
| KR | 107562812 B | 1/2021 |
| KR | 10-2021-0023680 A | 3/2021 |
| WO | 2020122456 A1 | 6/2020 |

OTHER PUBLICATIONS

Misra et al., "Text Extraction and Recognition from Image using Neural Network," International Journal of Computer Applications, vol. 40, No. 2, pp. 13-19, Feb. 2012, Total 8 pages.

International Notification of Transmittal, Search Report and Written Opinion (PCT/ISA/220, PCT/ISA/210 & PCT/ISA/237), dated Nov. 24, 2022, issued by International Searching Authority, Application No. PCT/KR2022/012668.

Shaham, "Augmented Reality in Customer Service: A Success Story", TechSee, Nov. 27, 2018, (11 pages total).

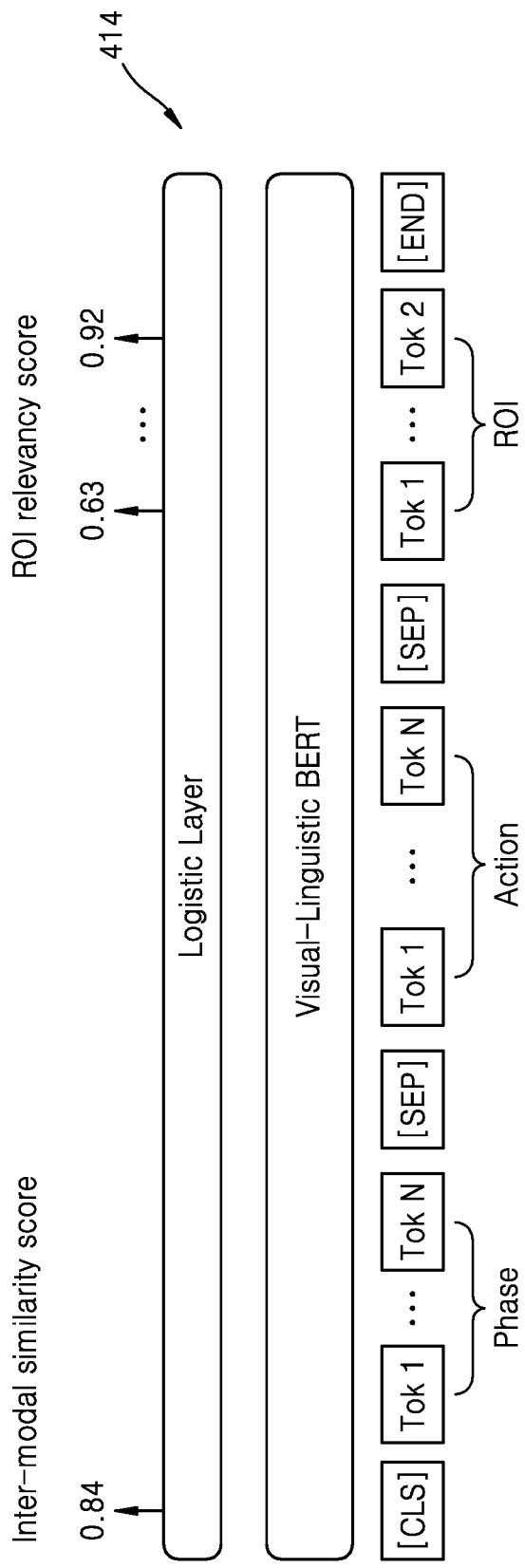

METHOD AND SYSTEM FOR SELECTING MARKER FOR MODIFYING A SCENE WITHIN AN AUGMENTED REALITY BASED COMPUTING ENVIRONMENT

CROSS-REFERENCE TO RELATED APPLICATION(S)

This application is a continuation application of International Application No. PCT/KR2022/012668, filed Aug. 24, 2022, in the Korean Intellectual Property Receiving Office and claiming priority to Indian Patent Application No. 202111046019, filed on Oct. 8, 2021, the disclosures of which are incorporated by reference herein in their entireties.

FIELD

The disclosure relates to augmented reality (AR) environment and in particular relates to generating information within the AR environment.

BACKGROUND

Augmented reality (AR) has emerged as an innovative tool that allows enterprises opportunities to interact with consumers on their preferred devices. Organizations incorporate augmented reality remote assistance as a powerful collaborative solution for remote guidance, into their customer support systems. This is far more efficient than auditory communication, since visually highlighting the desired actions enables faster and more accurate comprehension and execution of instructions. Also, end users prefer quick resolution of their problem and prefer step by step visual guide, instead of reading through long-text.

However, adding AR content is time consuming as it involves AR scene selection, markers identification, AR resource (text, images, video clips, sounds, 3D models and animations) selection/procurement from databases, and finally combining all these to render AR experience. As indicated in FIG. 1, as a first stage, curators read images and documents based on input images and text; as a second stage, curators manually select markers based on expertise; and finally as a third stage, curators find actions to be taken. Augmented reality markers are visual cues which trigger the display of the virtual information. The augmented reality markers are normal images or small objects which have to be manually identified and trained beforehand so that they can be recognized later within a camera stream.

In AR-assisted product troubleshooting applications, each product view needs to be manually curated for markers. As a manufacturer may have multiple products with multiple models in each geography, such manual curation becomes an expensive task. Still further, product manual or related text description is searched for actions to be rendered on markers.

It is even harder for any consumer electronics manufacturer to add AR assistance to their product manuals as it involves reading entire manual to identify facts and questions which will form an AR scene, identify important keywords/issues/visual area to select markers and finally look up for relevant AR resource that will serve the response/answer to the facts and questions.

An example augmented reality (AR) process as referred in FIG. 1 involves selection of 'markers and actions' by a manual curator based on scene (image), instruction guide (text) and application/device context in view. However, such manual curation for augmenting customer's view of product becomes costly and time-consuming activity as products and their models increase.

Overall, an AR content creation process is largely manual and extremely time consuming. In the related art, AR toolkits and reality composers provide interfaces to choose real-world objects to anchor the scene, position virtual elements within the scene, select from large collection of customizable assets or import in certain format, and finally combine in AR.

However, due to the cost of manual effort required in AR content creation, only few main instruction steps are augmented with digital objects. All procedural steps do not have AR based assistance as content creators are hard pressed with time (e.g., especially when product is ready to be released).

SUMMARY

This summary is provided to introduce a selection of concepts, in a simplified format, that are further described in the detailed description of the disclosure. This summary is neither intended to identify key or essential inventive concepts of the disclosure and nor is it intended for determining the scope of the disclosure.

According to an aspect of an example embodiment, provided is a method for selecting a marker to be included in a scene provided in an augmented reality (AR) environment, the method including: receiving an image in the AR environment; extracting one or more region of interests (ROIs) from the received image based on an artificial neural network (ANN); identifying a text within the one or more ROIs or from at least one document associated with the one or more ROIs; determining one or more phrase-action pairs from the identified text; calculating inter-modal similarity between the one or more ROIs and the one or more phrase-action pairs to generate a set of phrase-action-ROI tuples, wherein each tuple of the set of phrase-action-ROI tuples includes a phrase-action pair and at least one ROI; computing intra-modal similarity with respect to each tuple of the set of phrase-action-ROI tuples based on a comparison between at least one of: (a) the phrase-action pair and a text corresponding to the at least one ROI; and (b) the at least one ROI and an image corresponding to the phrase-action pair; selecting one or more phrase-action-ROI tuples of the set of phrase-action-ROI tuples as a marker for the received image, the selecting being based on the computed intra-modal similarity being above a threshold; and updating a scene provided in the AR environment based on the selected one or more phrase action-ROI tuples.

According to an aspect of an example embodiment, provided is an apparatus for diagnosing malfunctioning in a device based on imaging in an augmented reality (AR) environment, the apparatus being provided in a system on chip (SoC) or a distributed computing system, the apparatus including: an imaging sensor configured to receive an image of a malfunctioning device; an artificial neural network (ANN) configured to extract one or more region of interests (ROIs) from the received image; a natural language processing (NLP) module configured to: identify a text within the one or more ROIs or from at least one document associated with the one or more ROIs; determine one or more phrase-action pairs from the identified text; a visual-linguistic transformer module configured to: calculate inter-modal similarity between the one or more ROIs and the one or more phrase-action pairs to generate a set of phrase-action-ROI tuples, wherein each tuple of the set of phraseaction-ROI tuples includes a phrase-action pair and at least one ROI; compute intra-modal similarity with respect to each tuple of the set of phrase-action-ROI tuples based on a comparison between at least one of: (a) the phrase-action pair and a text corresponding to the at least one ROI; and (b) the at least one ROI and an image corresponding to the phrase-action pair; and select one or more phrase-action-ROI tuples of the set of phrase-action-ROI tuples as a marker for the received image, selection being based the computed intra-modal similarity being above a threshold; an augmented reality (AR) engine configured to visibly highlight the marker within the received image to indicate information related to a malfunction of the malfunctioning device; and a display configured to render the received image and the highlighted marker on the received image.

According to an aspect of an example embodiment, provided is a method for selecting a marker to be included in a scene provided in an augmented reality (AR) environment, the method including: receiving an image in the AR environment; extracting one or more region of interests (ROIs) from the received image based on an artificial neural network (ANN); identifying a text within the one or more ROIs or from at least one document associated with the one or more ROIs; determining one or more phrase-action pairs from the identified text; calculating inter-modal similarity between the one or more ROIs and the one or more phrase-action pairs to generate a set of phrase-action-ROI tuples, wherein each tuple of the set of phrase-action-ROI tuples includes a phrase-action pair and at least one ROI; computing intra-modal similarity with respect to each tuple of the set of phrase-action-ROI tuples based on a comparison between at least one of: (a) the phrase-action pair and a text corresponding to the at least one ROI; and (b) the at least one ROI and an image corresponding to the phrase-action pair; selecting one or more phrase-action-ROI tuples of the set of phrase-action-ROI tuples as a marker for the received image, the selecting being based on the computed intra-modal similarity being above a threshold; and updating a scene provided in the AR environment based on the selected one or more phrase action-ROI tuples.

To further clarify advantages and features of the disclosure, a more particular description of the disclosure will be rendered by reference to specific embodiments thereof, which is illustrated in the appended drawings. It is appreciated that these drawings depict only example embodiments of the disclosure and are therefore not to be considered limiting of the scope of the disclosure. The disclosure will be described and explained with additional specificity and detail with the accompanying drawings.

BRIEF DESCRIPTION OF THE DRAWINGS

These and other features, aspects, and advantages of the disclosure will become better understood when the following detailed description is read with reference to the accompanying drawings in which like characters represent like parts throughout the drawings, wherein:

FIGS. 7A and 7B illustrate multimodal similarity computation defined by inter-modal similarity computation in accordance with an embodiment of the disclosure;

Figure 1:
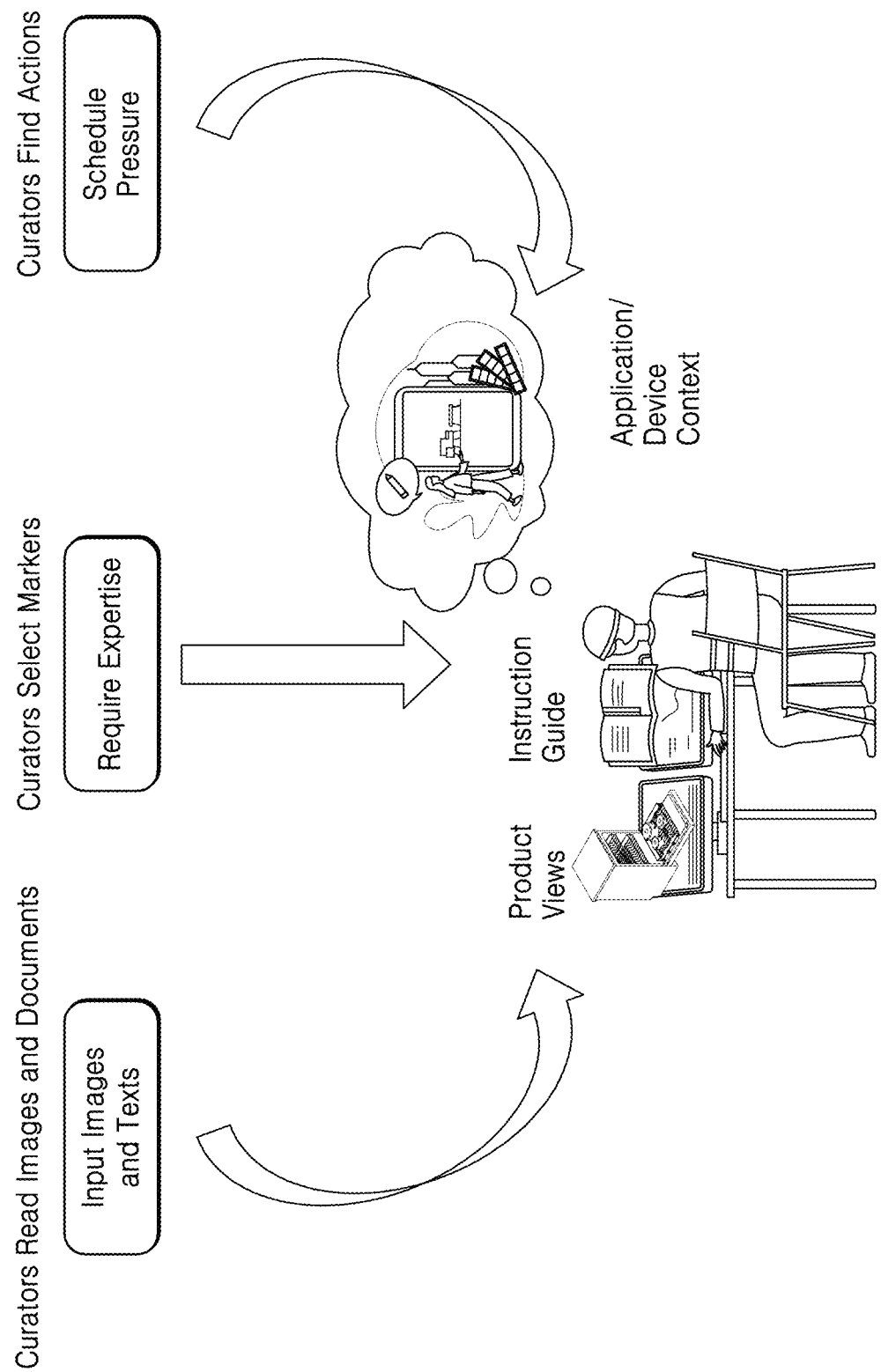
FIG. 1 illustrates an example augmented reality (AR) process.

Further, skilled artisans will appreciate that elements in the drawings are illustrated for simplicity and may not have been necessarily drawn to scale. For example, the flow charts illustrate the method in terms of the most prominent steps involved to help to improve understanding of aspects of the disclosure. Furthermore, in terms of the construction of the device, one or more components of the device may have been represented in the drawings by conventional symbols, and the drawings may show only those specific details that are pertinent to understanding the embodiments of the disclosure so as not to obscure the drawings with details that will be readily apparent to those of ordinary skill in the art having benefit of the description herein.

DETAILED DESCRIPTION

For the purpose of promoting an understanding of the principles of the disclosure, reference will now be made to the embodiment illustrated in the drawings and specific language will be used to describe the same. It will nevertheless be understood that no limitation of the scope of the disclosure is thereby intended, such alterations and further modifications in the illustrated system, and such further applications of the principles of the disclosure as illustrated therein being contemplated as would normally occur to one skilled in the art to which the disclosure relates.

It will be understood by those skilled in the art that the foregoing general description and the following detailed description are explanatory of the present disclosure and are not intended to be restrictive thereof.

Reference throughout this specification to "an aspect", "another aspect" or similar language means that a particular feature, structure, or characteristic described in connection with the embodiment is included in at least one embodiment of the present disclosure. Thus, appearances of the phrase "in an embodiment", "in another embodiment" and similar language throughout this specification may, but do not necessarily, all refer to the same embodiment.

The terms "comprises", "comprising", or any other variations thereof, are intended to cover a non-exclusive inclusion, such that a process or method that comprises a list of steps does not include only those steps but may include other steps not expressly listed or inherent to such process or method. Similarly, one or more devices or sub-systems or elements or structures or components proceeded by "comprises . . . a" does not, without more constraints, preclude the existence of other devices or other sub-systems or other elements or other structures or other components or additional devices or additional sub-systems or additional elements or additional structures or additional components.

Unless otherwise defined, all technical and scientific terms used herein have the same meaning as commonly understood by one of ordinary skill in the art to which this disclosure belongs. The system, methods, and examples provided herein are illustrative only and not intended to be limiting.

Embodiments of the disclosure will be described below in detail with reference to the accompanying drawing.

Figure 2:
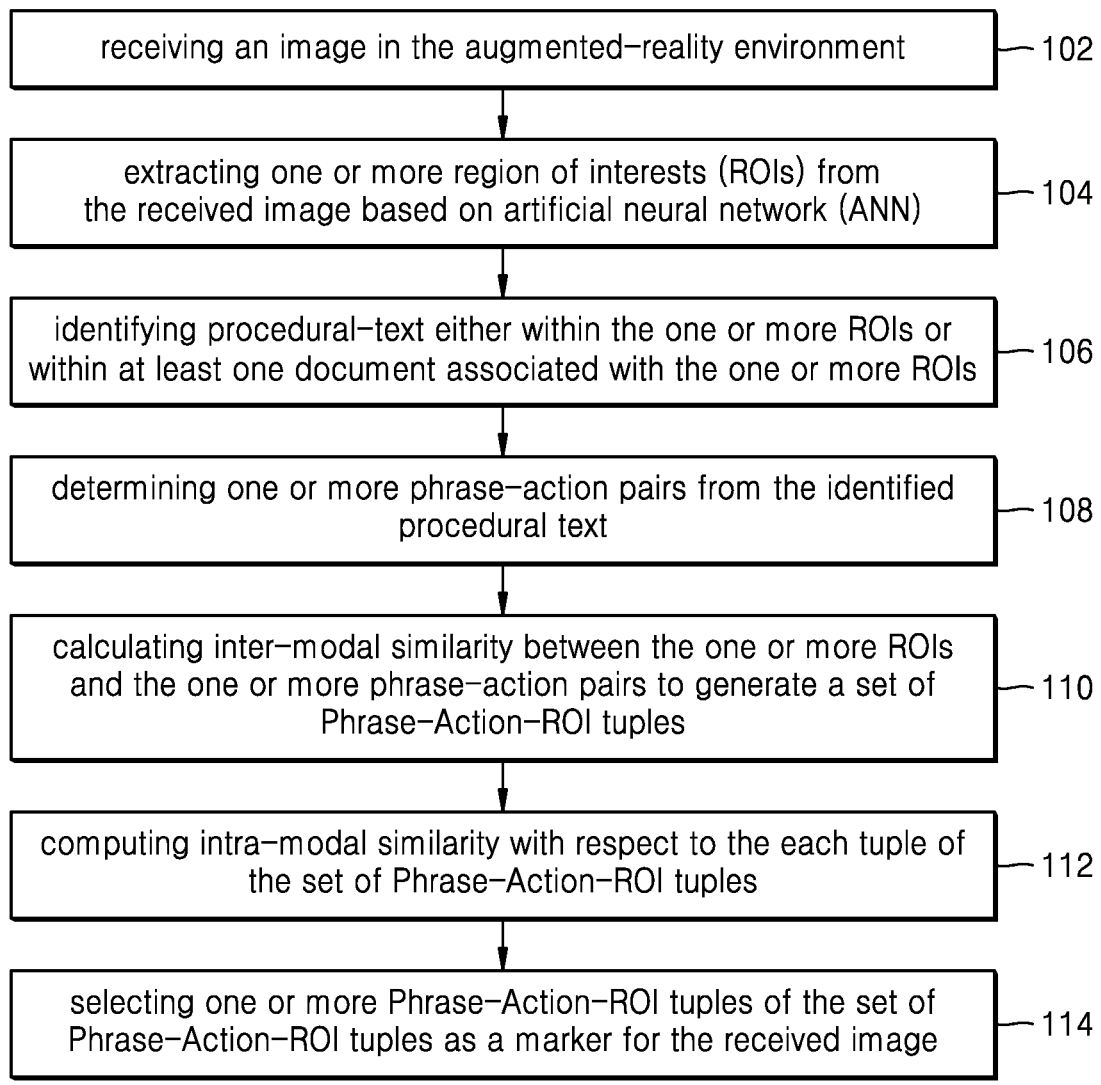
FIG. 2 illustrates method steps in accordance with an embodiment of the disclosure.

FIG. 2 illustrates method steps in accordance with an embodiment of the disclosure.

The disclosure provides a method for selecting a marker for modifying (or updating) a scene within an augmented reality based computing environment. The method comprises receiving (102) an image in an augmented-reality environment. One or more region of interests (ROIs) is extracted (104) from the received image based on artificial neural network (ANN). Such extraction comprises applying an object detection technique to the received image to detect a plurality of objects as the one or more ROIs within the image. A vector is generated for each ROI as a representation for each of the one or more ROIs.

Further, the method comprises identifying (106) procedural-text either within the one or more ROIs or within at least one document associated with the one or more ROIs. From the identified procedural text, one or more phrase-action pairs are determined (108). The determining of the one or more phrase-action pairs further comprises transforming phrase and action embedding for each of the one or more determined phrase-action pairs into vectors corresponding to a same vector space, determining a causal-relationship amongst the vectors for each of the determined phrase-action pairs, and determining first shortlisted one or more phrase-action pairs from the determined one or more phrase-actions pairs based on a magnitude of the causal-relationship for enabling calculation of the inter-modal similarity.

Further, the method comprises calculating (110) inter-modal similarity between the one or more ROIs and the one or more phrase-action pairs to generate a set of phrase-action-ROI tuples, wherein each tuple of the set of phrase-action-ROI tuples comprises a phrase-action pair and at least one ROI. The calculating of the inter-modal similarity comprises accessing the representation for the one or more ROIs. A representation is generated for the first shortlisted one or more phrase-action pairs by generating vectors for the first shortlisted one or more phrase-action pairs, wherein the representations for the one or more ROIs and the one or more phrase-action pairs correspond to a common embedding space. Thereafter, the inter-modal similarity is calculated between the one or more ROIs and the first shortlisted one or more phrase-action pairs within the common embedding space.

Further, the method comprises computing intra-modal similarity (112) with respect to each tuple of the set of phrase-action-ROI tuples based on a comparison between at least one of: (a) the phrase-action pair and a text equivalent of the ROI, and (b) the at least one ROI and an image equivalent of the phrase-action pair. The image equivalent of the phrase-action pair may correspond to a real-time generated ROI from the phrase-action pair within the tuple, and the text equivalent of the ROI may correspond to a real-time generated phrase-action pair defined by the procedural text within each ROI of the one or more ROIs.

Further, the method comprises selecting (114) one or more phrase-action-ROI tuples of the set of phrase-action-ROI tuples as a marker for the received image, said selection being based on the computed intra-modal similarity being above a threshold. The marker and an associated context are matched with a plurality of 3D objects in an AR resource database. An index of at least one AR object is accessed from the AR resource database based on the matching, and the at least one AR object is placed within the received image at a location over the marker or nearby the marker. Further, a location of the AR object is determined based on locating an ROI within the received image, said located ROI closely matching with the image equivalent of the phrase-action pair. An ROI metadata may be created in global dataset using the marker and the AR object, said ROI metadata comprising data pertaining to a location of the marker, phrase-action associated with the marker, an AR object identifier, and an AR object location.

Figure 3:
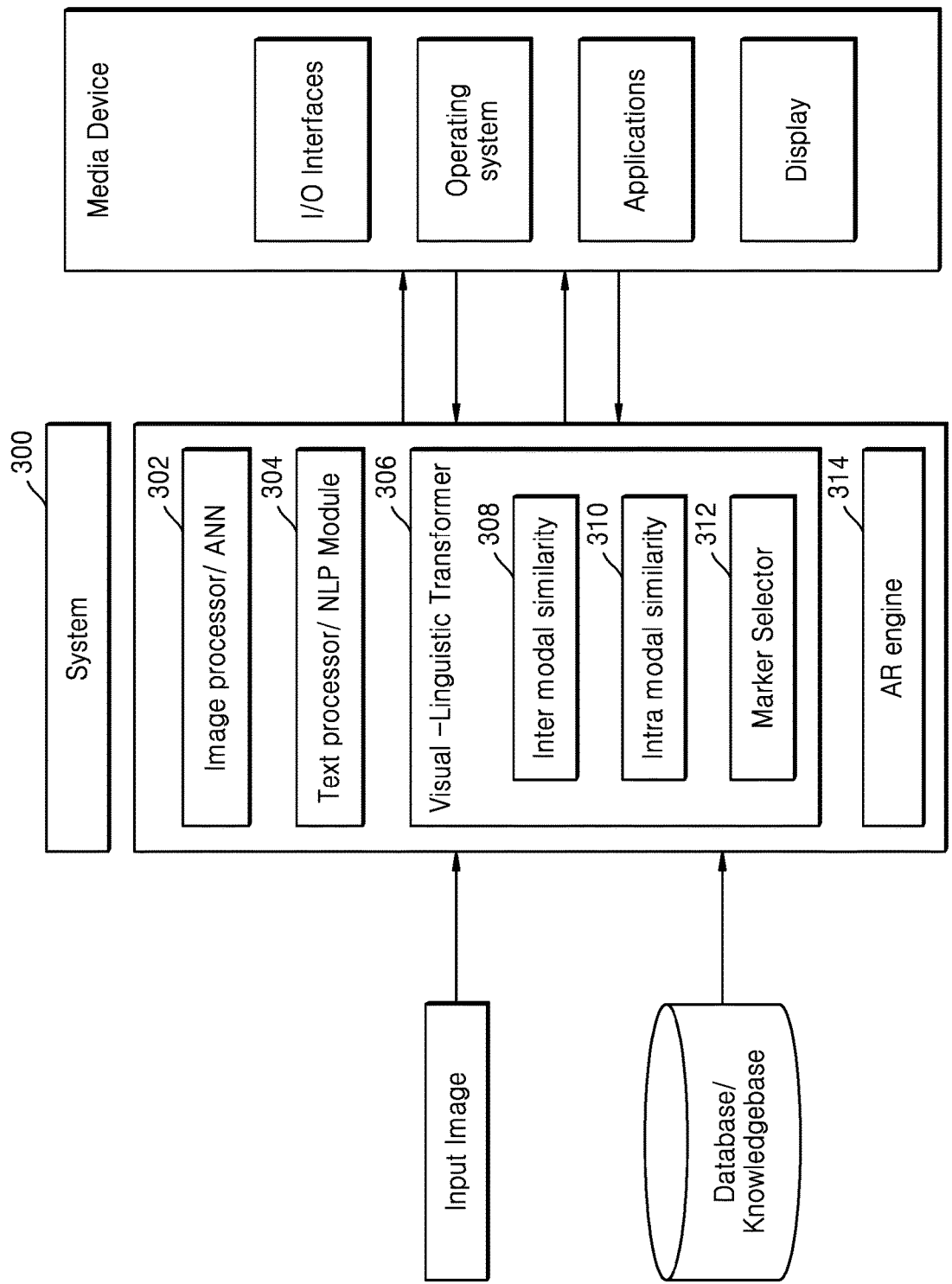
FIG. 3 illustrates an overview of architecture in accordance with the method steps of FIG. 2.

FIG. 3 illustrates an overview of architecture 300 in accordance with the method steps of FIG. 2. The architecture 300 may be divided into various components provided as follows.

An image processor module 302 is responsible for ROI extraction from image in accordance with step 102 in FIG. 2. Text processor module 304 is responsible to extract text from input-image and also handle the extraction of key phrases and their associated action extraction from the related text document in accordance with steps 104, 106 and 108 in FIG. 2.

A multimodal similarity module 306 or a visual-linguistic transformer is used to find association between an image (e.g., ROI) and text (e.g., phrase action pair). The multimodal similarity module 306 includes two major sub modules as follows:

a) Intra-modal similarity module 308: The objective of intra modal similarity is to compare an extracted ROI with a generated ROI and an extracted phrase-action with a generated phrase action in accordance with step 110; and b) Inter modal similarity module 310: The objective of inter modal similarity is to compare an extracted ROI with an extracted phrase-action pair in common embedding space in accordance with step 112.

Finally, the scores of both modalities are combined to output and provide a final score to a marker selector module 312 as input as a part of step 114. An AR engine or AR scene render 314 outputs a final response by combining the metadata information with an ROI to enable the AR object rendering to be faster.

Figure 4A:
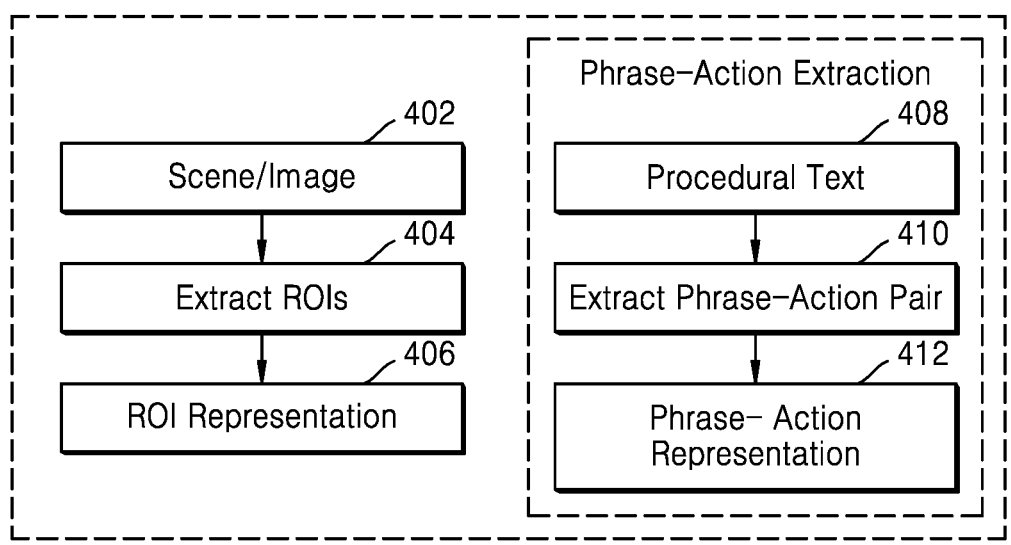
FIGS. 4A, 4B, and 4C illustrate an overview of control flow in accordance with an embodiment of the disclosure.
Figure 4B:
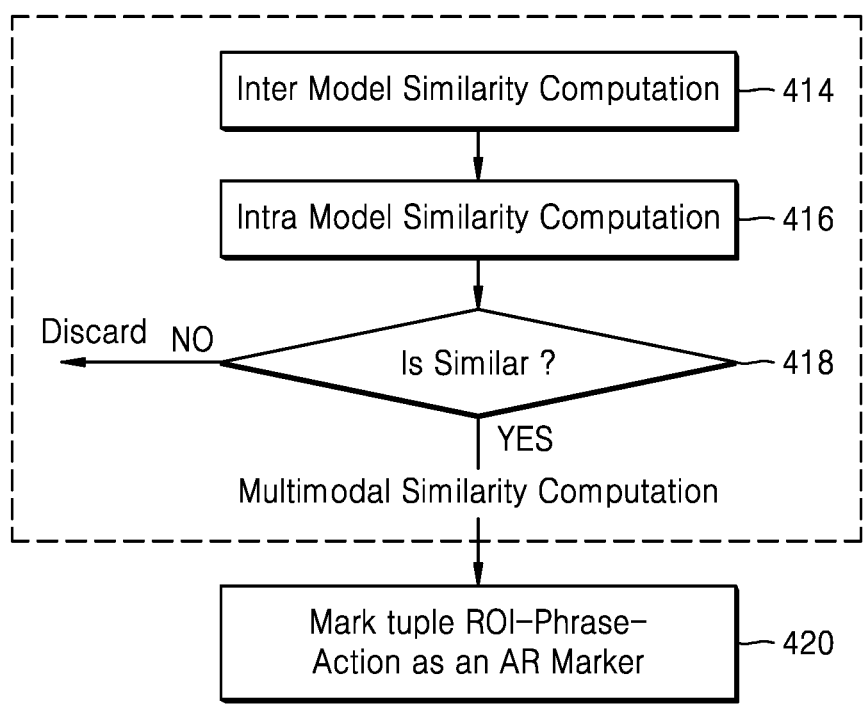

FIGS. 4A, 4B, and 4D illustrate an overview of control flow according to an embodiment of the disclosure, which may be divided into various categories as follows.

A first block represented by FIG. 4A and corresponding to steps 104, 106 and 108 in FIG. 2 is represented by ROI and phrase action representation. The first block covers ROI extraction 404 from an image 402 and resulting ROIs 406. Further, the first block covers key phrases and their associated action extraction 410 from a related text document 408. Further, both image and text representations 412 are created for similarity computation.

A second block represented by FIG. 4B refers multimodal similarity computation corresponding to steps 110, 112 and 114 in FIG. 2. The second block covers a method of finding an association between image (e.g., ROI) and text (a phrase action pair). It consists of two major sub-processes as follows:

a) Inter-modal similarity computation 414: The objective inter modal similarity is to compare an extracted ROI with an extracted phrase-action pair in common embedding space.

b) Intra-modal similarity computation 416: The objective of intra modal similarity is to compare an extracted ROI with a generated ROI and an extracted phrase-action with a generated phrase action.

Specifically, phrase-action-ROI that is selected in the inter-modal comparison stage is fed for intra-modal comparison. Finally, main N tuples are selected in steps 418 and 420 as markers at the output of this process.

Figure 4C:
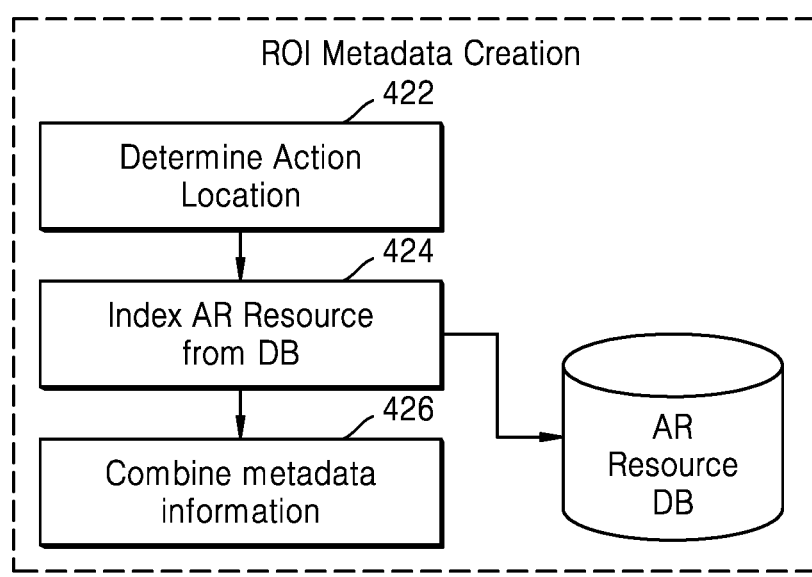

A third block represented by FIG. 4C is defined by ROI metadata creation corresponding to step 114 in FIG. 2. The third block finds a location of the AR object to be associated with the marker in step 422, identifies AR object(s) from AR resource DB in step 424, and update metadata information of all markers in global image in step 426. Specifically, the metadata information associated with the marker ROI is combined with the ROI of action AR object so that an AR object rendering may become faster.

Figure 5:
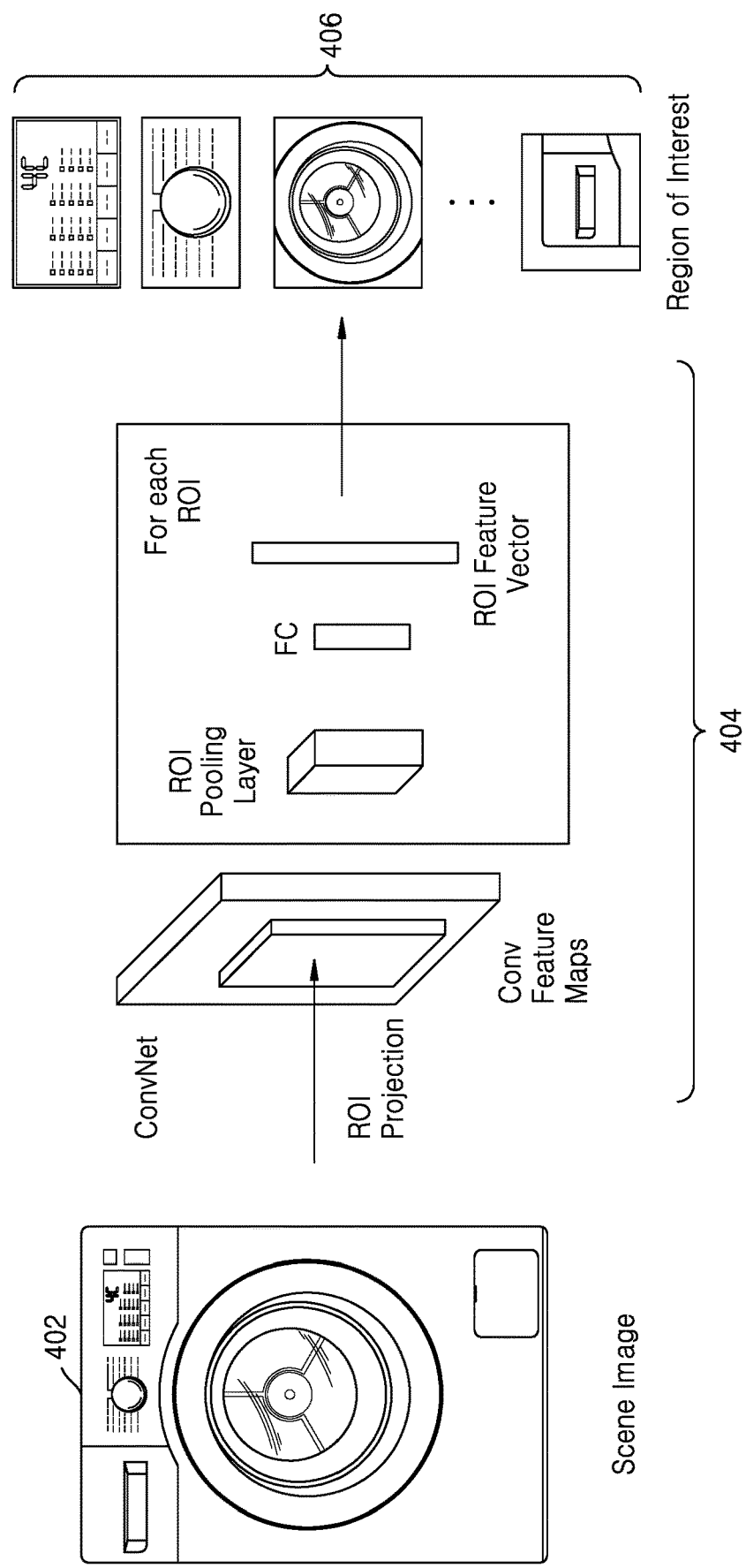
FIG. 5 illustrates extraction of a region of interest (ROI) in accordance with an embodiment of the disclosure.

FIG. 5 illustrates extraction of an ROI corresponding to FIG. 4A and corresponds to step 104 of FIG. 2. This block is used to find regions of interest (ROIs) in a scene image. Given an input image, ROIs are plausible locations where markers may be placed.

With respect to an input screen image 402, the ROI extractor 404 identifies a CNN based architecture such as VGG or ResNet as backbone followed by an ROI pooling layer. The output of this pooling layer is fed to fully connected layers from which the bounding boxes of the predicted ROIs are obtained. The working of this model is based on object detection techniques such as Fast-RCNN or the detection branch of the Faster-RCNN.

Once all the ROIs are extracted from the scene in step 406, such parts are sliced from the full scene image. The feature vector is also stored prior to the output layer for each ROI.

Let $R \in \{r\_1, r\_2 \ldots r\_m\}$ be the feature vectors of m ROIs extracted from the image, such that R is referred as the ROI representation henceforth.

Figure 6A:
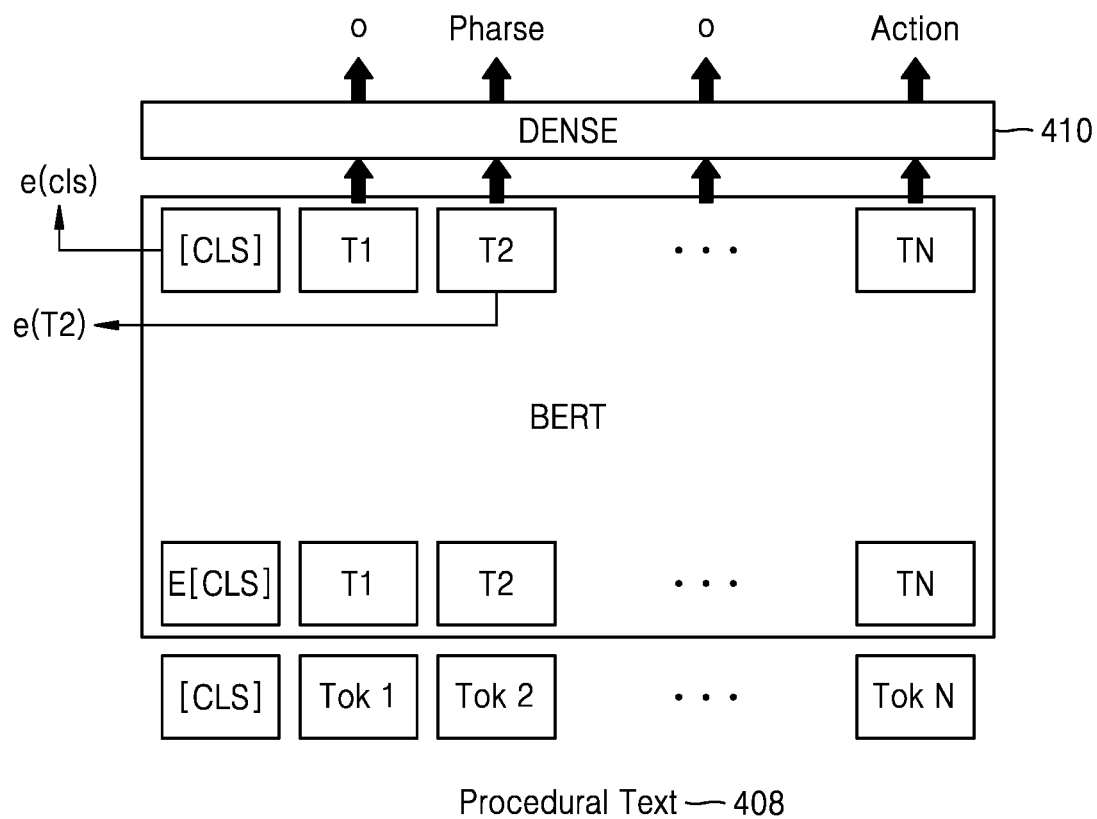
FIGS. 6A and 6B illustrate phrase-action extraction process in accordance with an embodiment of the disclosure.
Figure 6B:
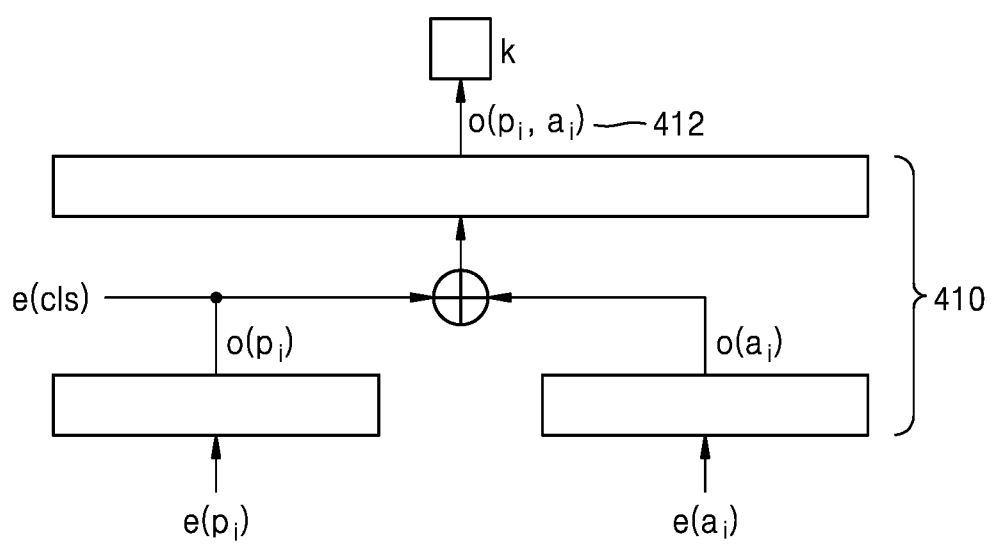

FIGS. 6A and 6B illustrate phrase-action extraction process corresponding to FIG. 4A and corresponds to step 104, 106 of FIG. 2. This block is used to extract pairs of phrases and their corresponding actions from a given procedural text 408. In a given input text, the phrases may be certain keywords which may help to define the marker and the actions denote the procedural or troubleshooting step to be performed as per the phrase.

As illustrated in FIG. 6A, the phrase-action extraction comprises a visual linguistic transformer model 410 such as a BERT model which takes text as an input. The output vector of each token is then fed to a feed-forward network (e.g., dense network) which classifies each token as phrases or actions. There may be multiple phrases and actions in a text and they are usually not contiguous. In order to find to find the best match for an action for a particular phrase, the causal relationship between the two is measured.

In an example, the input procedural text is

"The front load washing machine . . . DC error . . . Close the door . . . Service if persists".

The phrase-action pair extractor extracts phrase action pairs as follows:

DC Error→Close door
Power Outlet→Unplug
Drain tube→Dispense water

As illustrated in FIG. 6B, the pairs once extracted are formed into a representation 412. Let $P \in \{p_1, p_2, \ldots, p_n\}$ denote the set of phrases and $A \in \{a_1, a_2, \ldots a_n\}$ be the actions predicted in the text. For each $(p_i, a_i)$, the corresponding token embeddings are obtained from the BERT model. The output tensor of the [CLS] token which has the aggregate representation of the whole input text is also used. Let the embeddings of $p_i$, $a_i$, [CLS] be denoted by $e(p_i)$, $e(a_i)$, $e(cls)$, respectively.

A feed forward network is designed to quantitatively measure the causal relationship k, between a particular $(p_i, a_i)$. This metric may be used to find which action should be carried out for a particular phrase depending on the context from the procedural text. A high positive value denotes a higher causal relationship between the phrase and the action. The phrase and action embeddings are first transformed to the same vector space after which the sentence output representation is used to include the context to determine if the two are related. The output of the intermediate layers is used to compute k as follows.

$$k(p_i, a_i) = \frac{\sigma(o(p_i, a_i))}{\sigma(o(p_i)) \times \sigma(o(p_i))}$$

where $\sigma(.)$ is the variance. The range of k is $-1 \leq k \leq 1$.

This procedure is repeated for all pairs of phrase and action in the text. Only such pairs are then shortlisted as first shortlisted one or more phrase-action pairs for which k>threshold. As an example, for a desired phrase-action pair, such threshold may be set as 0.8. All the extracted phrase-action pairs considered as first shortlisted one or more phrase-action pairs are then stored for future use.

Figure 7B:
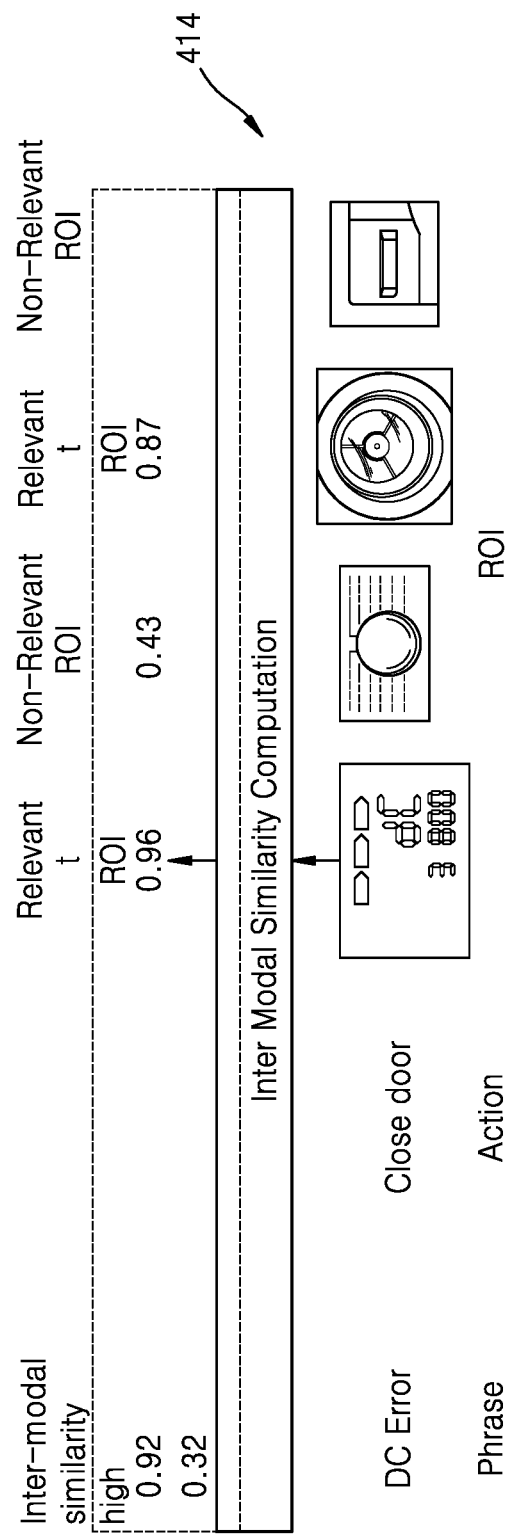

FIGS. 7A and 7B illustrate multimodal similarity computation defined by inter-modal similarity computation and corresponds to step 110 of FIG. 2 and step 414 of FIG. 4B.

In an implementation, the calculating of the inter-modal similarity within the common embedding space comprises concatenating the representation of the first shortlisted one or more phrase-action pairs with the representation for the one or more ROIs. In an example, a number N may be a number of one or more ROIs associated with each phrase-action pair within the first shortlisted one or more phrase-action pairs. A relationship is quantified based on the concatenating in terms of a first score. One or more phrase-action pairs are further shortlisted as second shortlisted pairs from the first shortlisted one or more phrase-action pairs achieved in FIG. 6 based on a thresholding of the first score.

The present block in FIG. 7A is used to find the similarity between extracted ROIs and phrase action pairs. From the previous blocks of FIGS. 4 to 6, the set of phrase-action pairs are extracted from the procedural text as well as the set of ROIs from the scene image. The present description of FIGS. 7A-7B attempts to find top matches of phrase-action pairs (e.g., second shortlisted pairs) with respect to the ROI using the multi modal input.

In an example, a visual-linguistic transformer based architecture such as a VL-BERT is employed to find the top matches. The input-format comprises both visual and linguistic elements in the form of <Phrase, Action, ROI>tuples. A pair of the extracted phrase-action tuple $(p\_i, a\_i)$ from FIG. 6 is obtained and concatenated with the ROI representation for an input to the VL-BERT. The output vectors represent the learnt-embeddings of each text-token or image ROI region. The embedding corresponding to the [CLS] token denotes the relationship between the text and the image input.

A logistic layer is added on top of the BERT model to quantify the computed relationship in terms of the first score. The first score is higher if the phrase and action text have a high similarity with the image-regions. The same process is repeated for all the extracted phrase-action pairs following which the top pairs are selected based on the thresholding of the first score. Accordingly, the second shortlisted phrase-action pairs are obtained.

Further, as a next stage and as depicted in FIG. 7B, score of each ROI of the one or more ROIs is computed as a second score. Based on a thresholding of the second score, one or more ROIs are shortlisted from the one or more ROIs to be associated with each phrase-action pair in the second shortlisted one or more phrase action-pairs.

More specifically, subsequent to obtaining the candidates for the phrase-action pair as the second shortlisted set of pairs from FIG. 7A, the score of each ROI is calculated with the help of the logistic layer incorporated after the BERT architecture as shown in FIG. 7B. This is done so as to filter out the relevant image regions corresponding to the input text pair. From the m extracted ROIs, the top regions or ROIs are shortlisted based on a pre-defined score threshold or the thresholding of the second score. Here, multiple ROIs are to be shortlisted for a particular phrase-action pair. In an example, multiple image regions are relevant for a phrase or the phrase-action pair together corresponds to different regions.

Based on the second shortlisted phrase-action pairs and the shortlisted ROIs as referred above, the set of phrase-action-ROI tuples is generated. Each phrase-action-ROI tuple comprises:
 a) a phrase-action pair from the second shortlisted one or more phrase-action pairs; and
 b) at least one ROI from the shortlisted one or more ROIs.

In an example, a number M may be the number of the shortlisted ROIs for each phrase-action pair within the second shortlisted phrase-action pairs, wherein M<N. As aforementioned, N may be the number of one or more ROIs associated with each phrase-action pair within the first shortlisted one or more phrase-action pairs.

More specifically, a set of top candidates of phrase-action pairs along with the relevant ROIs are obtained. The same may be denoted as:

$$LV \in \{(p\_1, a\_1, r\_11 \ldots r\_m1), (p\_2, a\_2, r\_12 \ldots r\_m2) \ldots (p\_o, a\_o, r\_1o \ldots r\_mo)\}\}$$

Figure 8A:
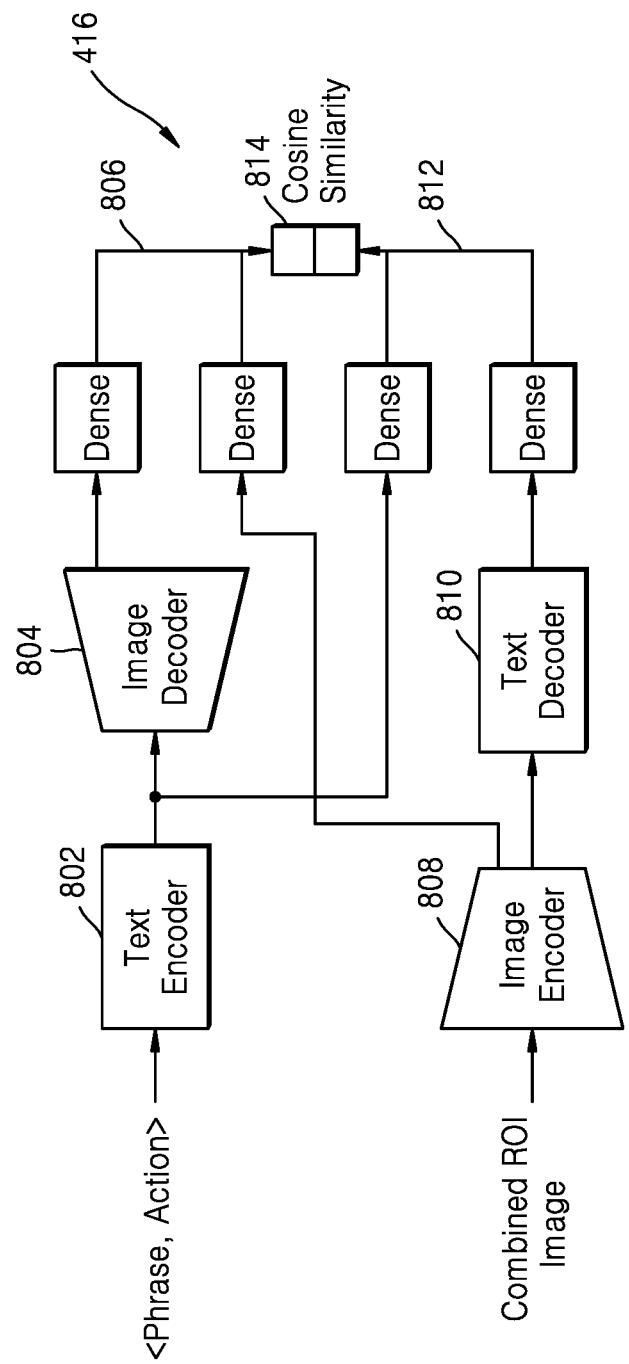
FIGS. 8A, 8B, and 8C illustrate multimodal similarity computation defined by intra modal similarity computation in accordance with an embodiment of the disclosure.
Figure 8B:
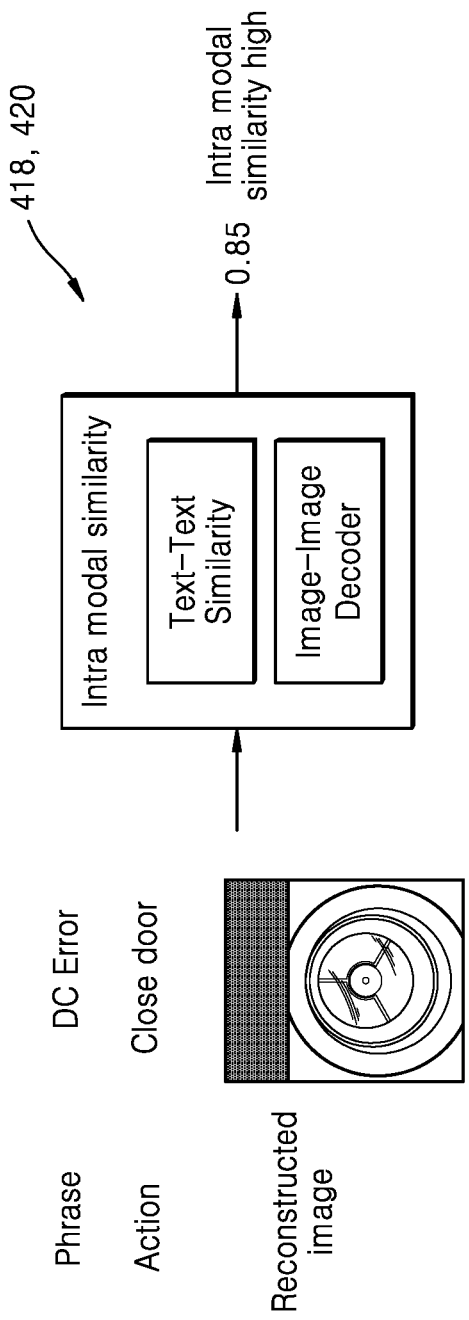
Figure 8C:
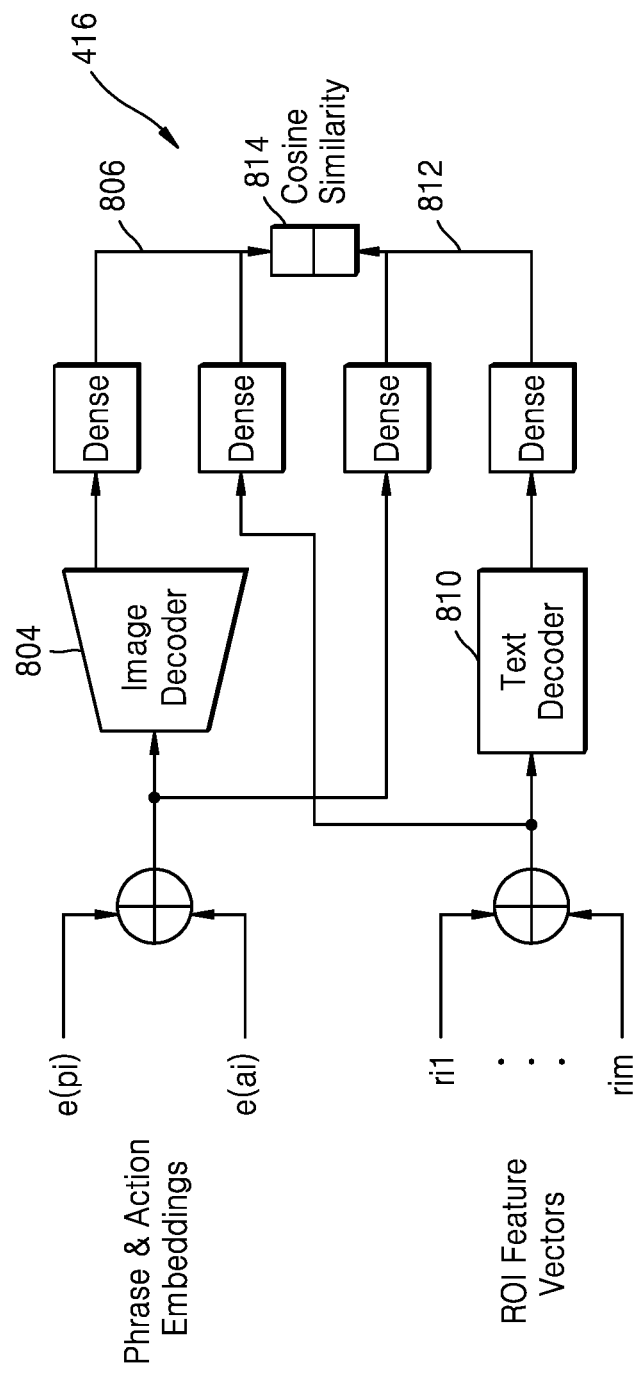

FIGS. 8A, 8B, and 8C illustrate multimodal similarity computation defined by intra modal similarity computation corresponding to step 112 of FIG. 2 and step 416 as referred in FIG. 4B. This block is used for marker selection in a scene by operating on the same modality of data. In other words, rather than working on two different modalities, e.g., text and image, the text-text and image-image feature comparison may be used.

From the inter modal similarity block of FIGS. 7A and 7B, a set of tuples comprising a phrase, an action and relevant ROIs are obtained. In order to operate on the same modality, a network as shown in FIG. 8A is implemented to obtain image like features from the textual input e.g., phrase-action pair and compute the similarity between the obtained image vector with ROIs. With respect to each tuple in the set of phrase-action-ROI tuples, an image is generated from the phrase-action pair of the tuple. Similarly, the image or the ROI in the tuple is decoded to yield textual output and compared with the existing extracted phrase and action.

A first similarity is computed between the generated image and the at least one ROI associated with the phrase action pair in the tuple. Such first similarity is referred by image—image similarity computation. For such purpose, the phrase-action text input is concatenated and fed to a text encoder 802 such as transformer encoder. This is followed by a deconvolution network or decoder 804 comprising unpooling and deconvolution layers. The output of this deconvolution network 804 produces image like features from text. To produce a single image from the multiple ROIs, the bounding box information may be employed to obtain an estimate of the relative position and scale of each ROI. With this, all the relevant ROIs are combined by simply stacking the relevant ROIs either horizontally or vertically to provide an input image. This image is passed to a convolution network 808 comprising convolution and pooling layers. The outputs of the convolution network 808 and deconvolution network 804 are fed to a feed forward network 806 (e.g., dense network) whose final layer provides a measure of the cosine similarity between the two images. More similar the images, higher will be the score.

Thereafter, for computation of second similarity, text is generated from the at least one ROI in the tuple. A second similarity is computed between the generated text and the phrase-action pair within the tuple. A single image is produced from the ROIs and passed into the convolution network 808. A text decoder 810 such as based on transformer is used and its output is used as the textual features from the image. The same text encoder 802 for phrase-action pair is used to extract the output. These two text vectors are passed onto another feed forward network (e.g., the dense network) 812 which finds the similarity based on cosine-similarity.

In an example, the cosine similarity between two n dimensional vectors A and B is defined as follows:

$$\text{sim}(A, B) = \frac{\sum_{i=1}^{n} A_i B_i}{\sqrt{\sum_{i=1}^{n} A_i^2} \sqrt{\sum_{i=1}^{n} B_i^2}}$$

The first cosine similarity is summed with the second cosine similarity to calculate an overall similarity score for each tuple in the set of tuples. One or more tuples are selected from the set of tuples as the marker for the received image based on the thresholding of the overall similarity-score.

As shown in FIG. 8B, both the upper and lower networks of FIG. 8A are trained jointly with a common optimization goal of increasing the cosine similarity between similar text/image inputs. The loss L is defined as the negative sum of the cosine similarity between the image vectors and between the text vectors.

$$L = -(\text{sim}(I_e, I_g) + \text{sim}(T_e, T_g))$$

where $I_e$ is the image feature vector from the extracted ROIs, $I_g$ is the image feature vector from the extracted phrase-action pair, $T_e$ is the text feature vector from the extracted phrase-action pair and $T_g$ is the text feature vector from the extracted ROIs.

At inference time, the data from the LV set is extracted and passed it one by one to this joint network. The tuple $(p_i, a_i, r_{i1}, \ldots r_{im})$ having the highest cosine similarity is chosen for the marker selection.

Further, in an implementation as shown in FIG. 8C, and as a further optimization step, the encoders 802, 808 at the start of the network in FIG. 8A may be removed. Instead, the phrase-action representation and relevant ROI representation from FIG. 6 may be ported. Rather than using the text encoder output, the output embedding of the phrase and action from the phrase-action extraction of FIG. 6, e.g., e (p_1), (a_i) are used for operating the network of FIG. 8A. Similarly, the ROI representation is used by concatenating and using as the second input.

Figure 9A:
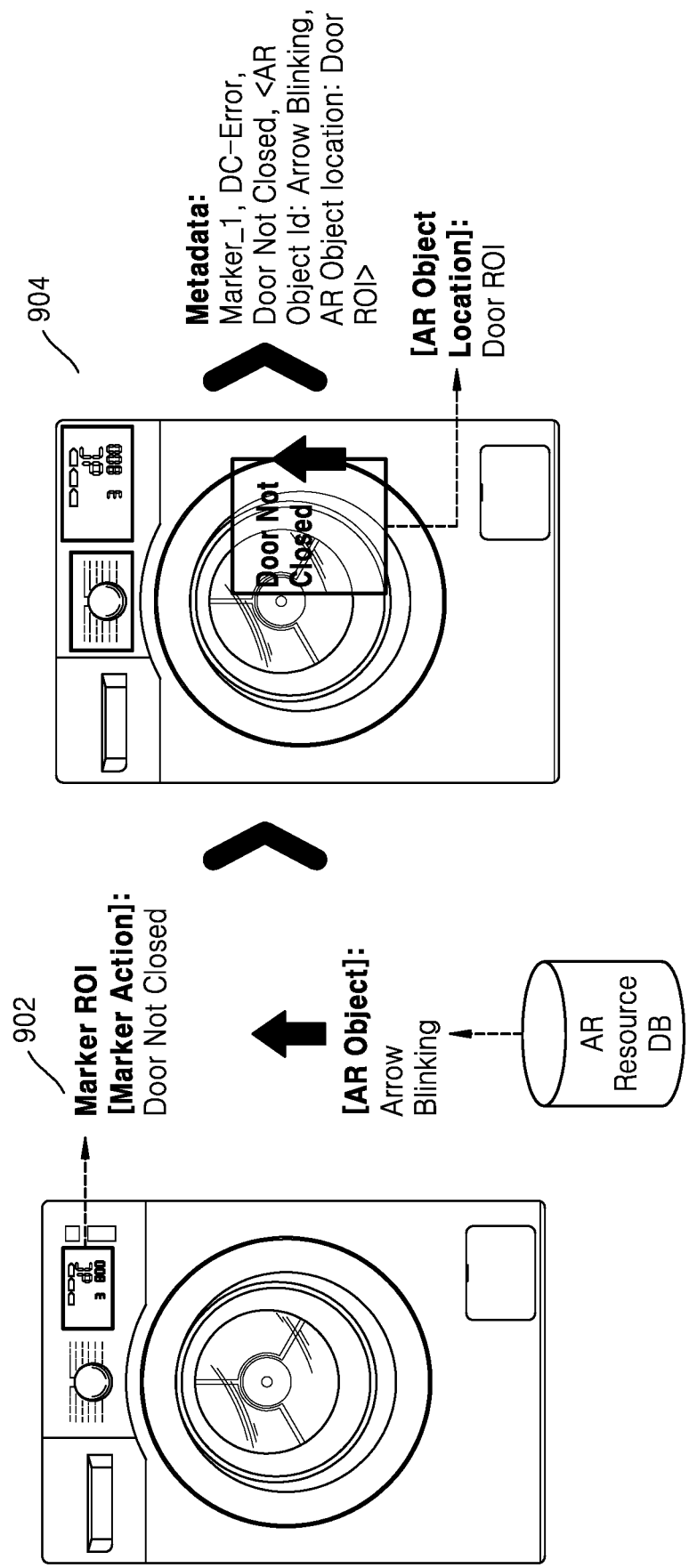
FIGS. 9A and 9B illustrate ROI metadata creation in accordance with an embodiment of the disclosure.
Figure 9B:
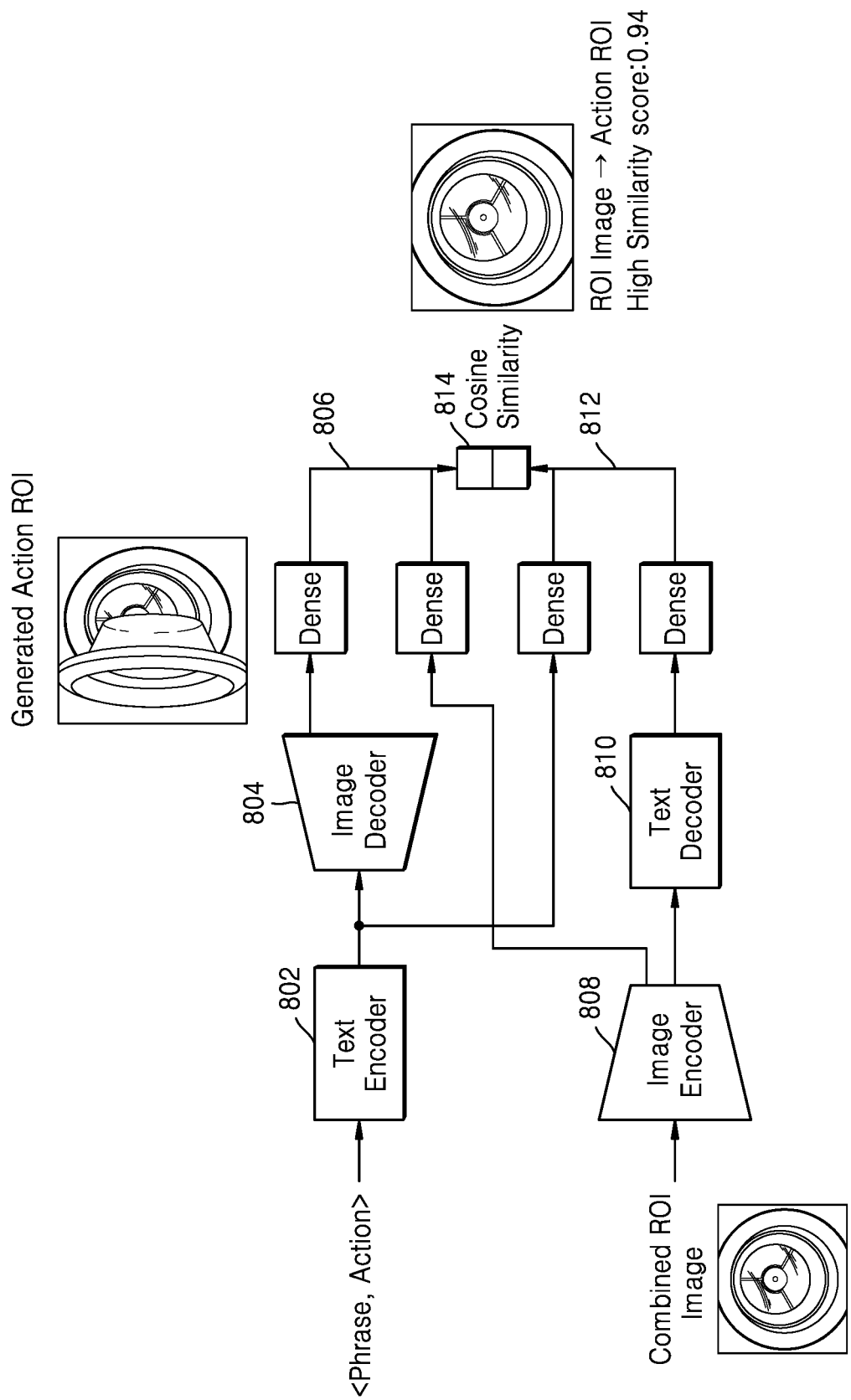

FIGS. 9A and 9B illustrate implementation of AR object upon the marker ROI and subsequent ROI metadata creation corresponding to FIG. 4C.

As shown in FIG. 9A, at step 902, the marker ROI (e.g., associated with action "Door Not Closed") and an associated context are matched with a plurality of 3D objects in an AR resource database to fetch a desired AR object. An index or a 3D object ID of at least one AR object for each marker is accessed from the AR resource database based on the matching.

At step 904, with respect to the fetched AR object, an ROI (or in other words an action ROI) is determined within the input image as a location of the AR object. A location of the AR object is determined within the input image based on locating an ROI within the received image. As it would be understood, AR objects may be rendered at a different ROI from the Marker ROI as shown in in the example provided at FIG. 9A.

As shown in FIG. 9B, to determine the location of an AR object or action ROI, the generated action ROI from the decoder 804 of FIG. 8A (e.g., intra modal similarity computation) is considered. A particular ROI within the input image which has highest similarity with the action ROI determined from the decoder 804 is considered. A relative position of the ROI within a global image is saved. Such determined location for the AR object is over the marker or nearby the marker. The at least one AR object is placed within the received image at such location over the marker or nearby the marker.

Finally, all these information related to marker (e.g., Marker ROI, Action, Action location/ROI, AR object Id) is collectively called metadata information of the marker. This information is updated in a global image for each marker ROI and helps in easy retrieval and rendering of AR objects whenever marker is identified in an AR scene as depicted in the present figure.

In other words, an ROI metadata is created in global dataset using the marker and the AR object, the ROI metadata comprising data pertaining to a location of the marker, phrase-action associated with the marker, an AR object identifier, and an AR object location.

Figure 10:
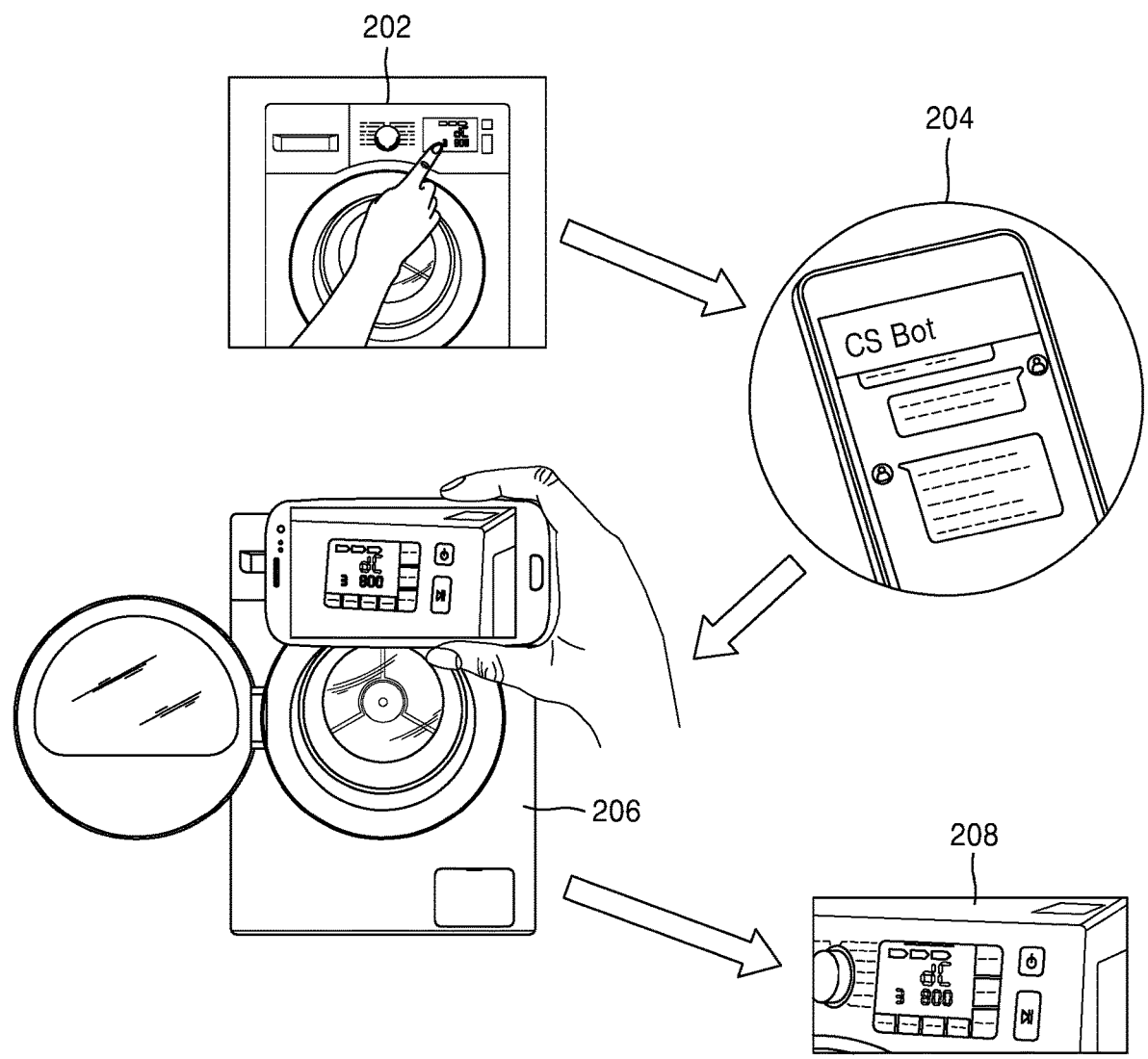
FIG. 10 illustrates a device diagnosis using augmented reality (AR) in accordance with an embodiment of the disclosure.

FIG. 10 illustrates a device diagnosis using AR according to an embodiment of the disclosure. The present implementation refers an apparatus defined by a system on chip (SoC) or a distributed computing system for diagnosing malfunctioning in a device based on imaging and augmented reality (AR) techniques. More specifically, the selected marker may be used for visibly highlighting and indicating a malfunction related location in the malfunctioning device. In such a scenario, the display screen may be configured to display a text message or symbol related to, for example but not limited to, cause of the malfunction, a location of the malfunction, a symbolic recommendation to overcome the malfunction, a text recommendation to overcome the malfunction and a text message for a user.

Referring to FIG. 10, in an example, steps of operation in the present example scenario are as follows:

At step 202, a washer of a user may have an error '4E'.

At step 204, the user opens customer support Chatbot to seek assistance. Chatbot directs the user for AR Assistance.

At step 206, a camera is opened, and the user is asked to point his or her device toward the error sign '4E'.

At step 208, marker and action ROIs are recognized. AR object/element is rendered. As it would be understood, a display of the AR object and the marker is rendered based on as aspect ratio or size of the display screen.

Figure 11:
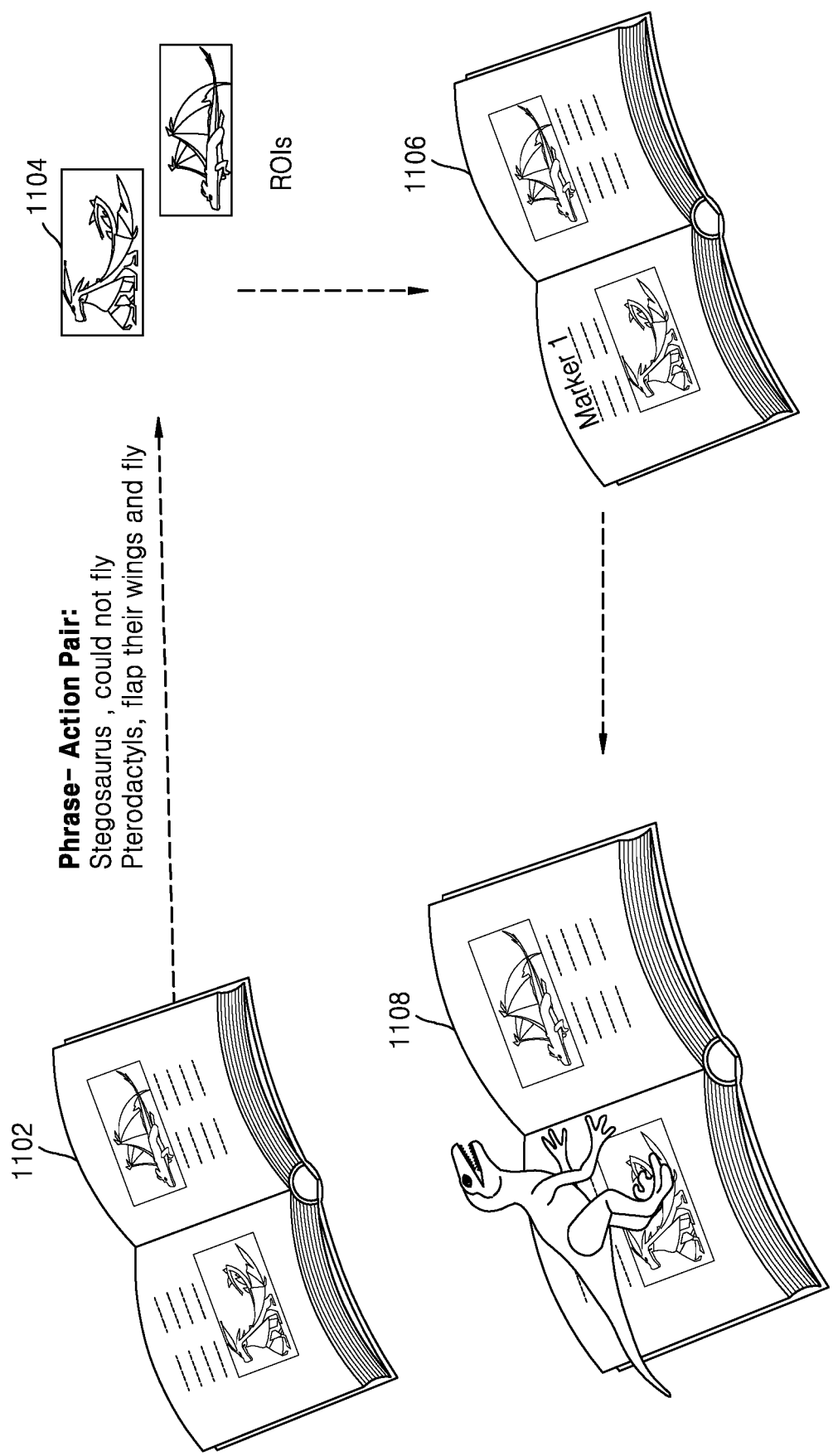
FIG. 11 illustrates an example AR book in accordance with an embodiment of the disclosure.

FIG. 11 illustrates an example AR book as example application of the disclosure.

At step 1102, the phrase-action pair is extracted from text present within the book, which includes the following text:

Once upon a time, 210 million years ago, the sun was shining as Sammy the Stegosaurus watched the pterodactyls flap their wings and fly above the treetops. 'Wow!' she thought, 'I have never seen a dinosaur that flies before!' She could not believe that pterodactyl's wingspan may be as large as 30 feet. It looked like fun, but it made Sammy feel frustrated and sad. She was a stegosaurus and could not fly. She did not have any friends to play with . . . .

The example phrase-action pairs are as follows

Stegosaurus, could not fly

Pterodactyls, flap their wings and fly

At step 1104, ROIs are extracted from the images portion of the book.

At step 1106, markers are selected upon the book. More specifically, markers are automatically identified and location of action is determined for rendering AR objects.

Figure 12:
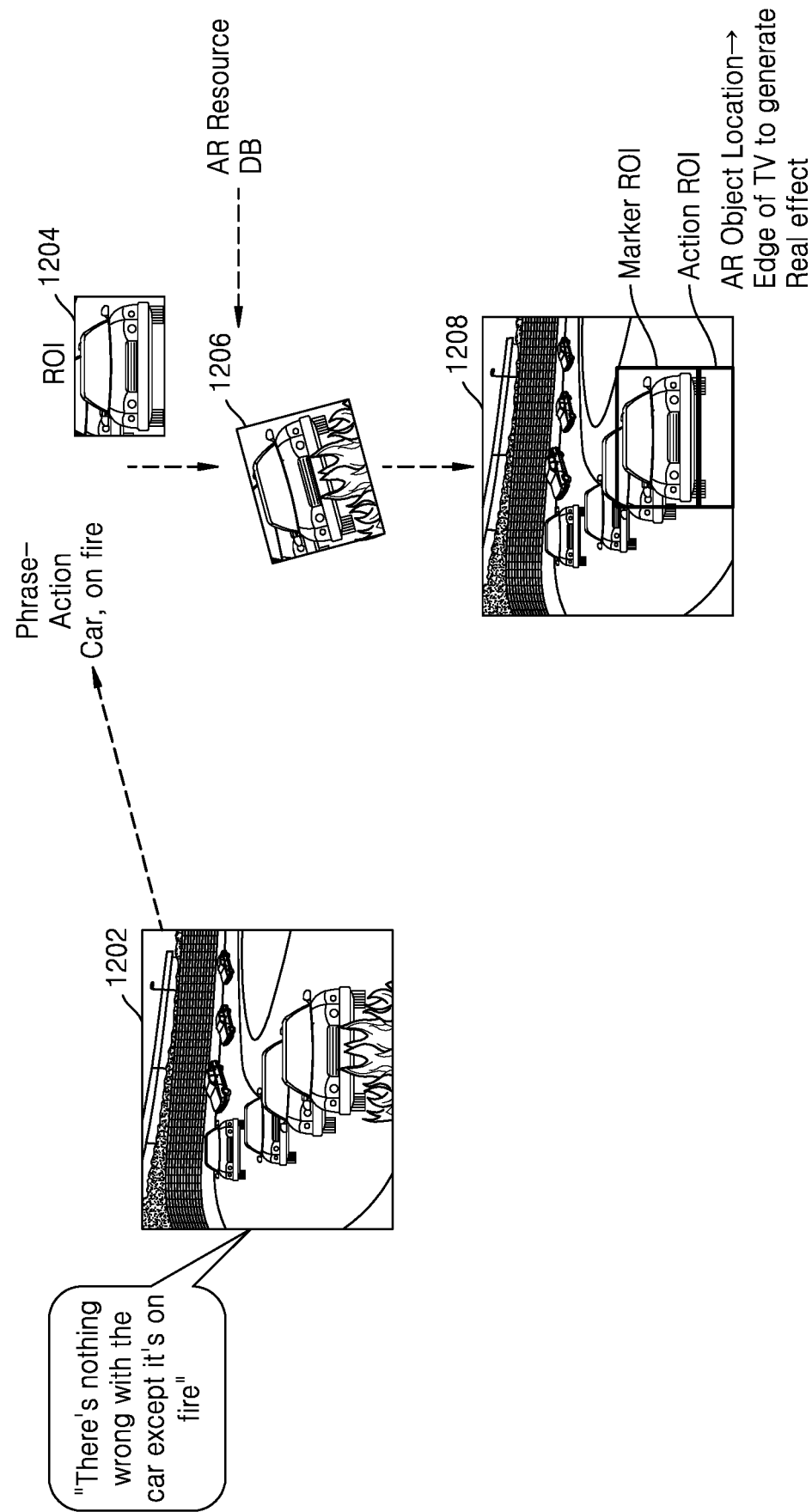
FIG. 12 illustrates an example rendering of AR content on a smart TV, in accordance with an embodiment of the disclosure.

FIG. 12 illustrates an example rendering of AR content on a smart TV according to an embodiment of the disclosure. The present implementation may be utilized to expand a linear video into a living room and allow interaction through engaging AR content by simply pointing a smartphone or tablet to the ongoing screenplay. The same at least enables to understand what is being watched, whether it is a live TV or an online video, and delivers engaging and interactive content to the smartphone that is held by the user.

At step 1202, a TV show is running with a natural language audio "There's nothing wrong with the car except it's on fire".

At step 1204, the phrase-action pair is identified as "Car, on fire" and a car image is extracted as ROI.

At step 1206, AR object (e.g., car with fire) is accessed from DB

At step 1208, the fetched AR object is placed at location close to the edge of the screen (a depicted in the smartphone display) to generate real effect. Marker is also separately identified within car image in the broadcast feed. The AR object accordingly denotes that said car in the broadcast feed as caught fire.

Figure 13:
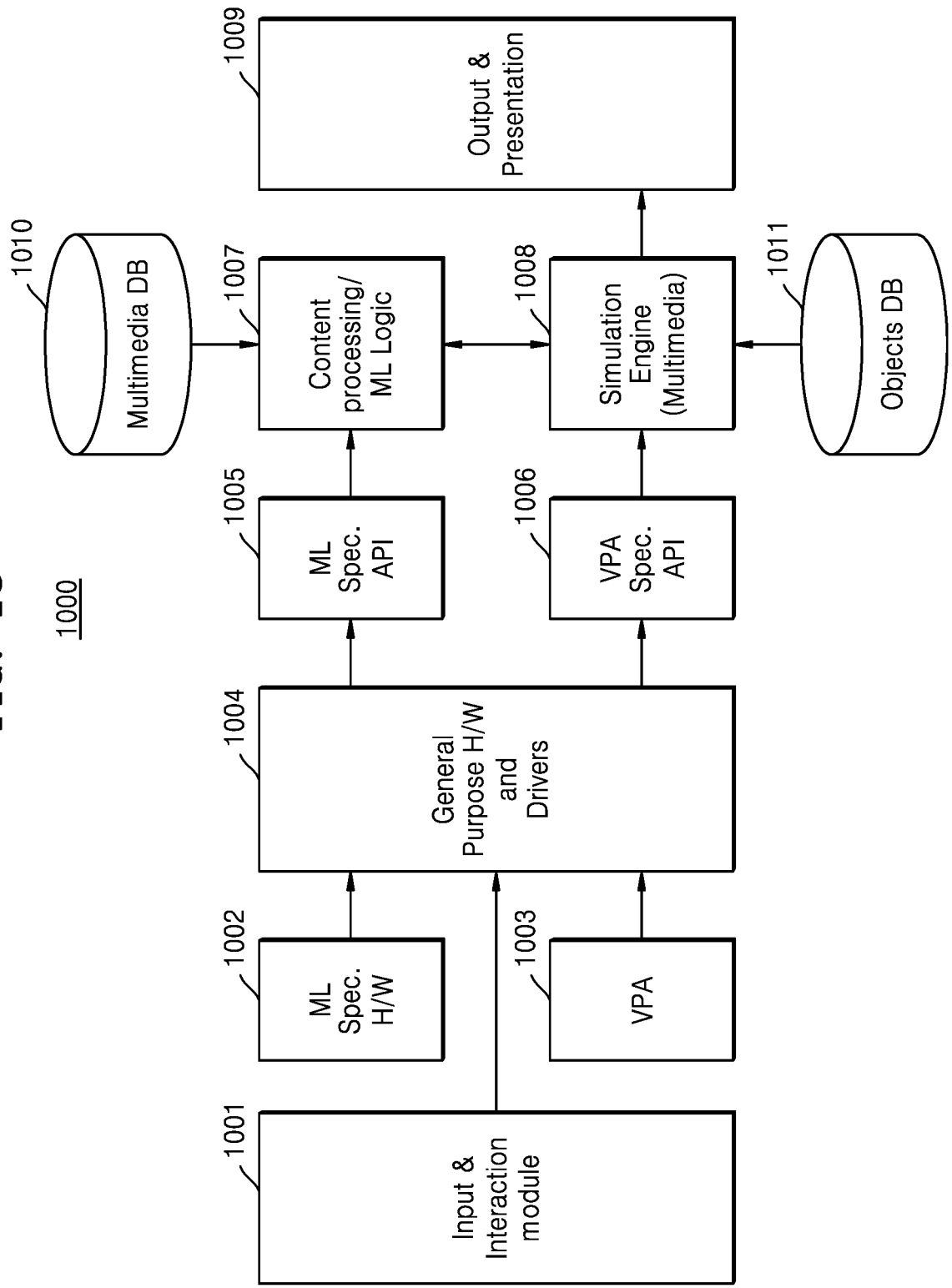
FIG. 13 illustrates machine learning based system for facilitating the operation of system of FIG. 3, in accordance with an embodiment of the disclosure.

FIG. 13 illustrates machine learning based system 1000 for facilitating the operation of system 300 of FIG. 3, in accordance with an embodiment of the disclosure. The present implementation of the machine learning (ML) based system 1000 for prediction and clustering may be implemented in hardware, software, firmware, or any combination thereof.

The ML based system 1000 includes an input and interaction module 1001 which is adapted for interpreting input accepted in the form of user's input and generating a response to the user. The input is compared to a database of interrelated concepts, which may be employed through ML specification hardware 1002.

The ML based system 1000 further includes a virtual personal assistant (VPA) 1003 which may interact with one of more general-purpose hardware and drivers 1004 to provide access to information.

The ML based system 1000 further includes an ML specification application programming interface (API) 1005. On the basis of identification of the user's input by the ML specification hardware 1002, the ML specification API 1005 may provide current knowledge regarding virtual personal assistance. The ML specification API 1005 may also, change, update, and/or modify the virtual personal assistant's information, based on explicit and/or implicit feedback based on user data such as user profiles, and from learning a person's preferences. Further, a multimedia database 1010 in collaboration with an ML logic 1007 may be provided. The ML logic 1007 may assist in updating the database by adding new concepts and relationships may be developed or strengthened based on machine learning.

In various implementations, the ML logic 1007 may include software logic modules that enable a virtual personal assistant to adapt the database for the user's usage patterns, preferences, and priorities, etc. The ML engine 1007 is also adapted to index various observations according to a set of pre-determined features, where these features define the characteristics of observation data that are of interest to the virtual personal assistant.

As a non-limiting factor, a separate VPA 1003 may be provided which is adapted to interpret conversational user input, determine an appropriate response to the input. The VPA 1003 is also adapted to provide response which may easily be understood and interpreted by the user. As a non-limiting factor, a plurality of software components may be implemented to accomplish such task.

The VPA 1003 may be communicatively coupled with a network from where the VPA 1003 may fetch information from one or more websites. As a non-limiting factor, the websites may include the API. In some embodiments, the VPA 1003 may optionally be incorporated into other subsystems or interactive software applications, for example, operating systems, middleware or framework, such as VPA specification API 1006 software, and/or user-level applications software (e.g., another interactive software application, such as a search engine, web browser or web site application, or a user interface for a computing device). Such applications may also include position-infotainment systems, position-based VPA applications, Smart devices, etc.

The ML based system 1000 may further perform simulation in a simulation engine 1008 based on the responses received from VPA specification API 1006 and the ML logic 1007 and one or more objects database 1011 to generate output and presentation 1009. In this way, the ML based system 1000 may have the ability to adapt to a user's needs, preferences, lingo and more.

Further, some embodiment may also be implemented as instructions stored on one or more machine-readable media, which may further be read and executed by one or more processors. A machine-readable medium may include any mechanism for storing or transmitting information in a form readable by a machine, for e.g., a computing device or a "virtual machine" running on one or more computing devices. For example, a machine-readable medium may include any suitable form of volatile or non-volatile memory.

In an implementation, the processors as used herein, refers to any type of computational circuit, such as, but not limited to, a microcontroller, a microprocessor, a complex instruction set computing microprocessor, a reduced instruction set computing microprocessor, a very long instruction word microprocessor, an explicitly parallel instruction computing microprocessor, a graphics processor, a digital signal processor, or any other type of processing circuit. The processors may also include embedded controllers, such as generic or programmable logic devices or arrays, application-specific integrated circuits, single-chip computers, smart cards, and the like.

In the case of implementation, an embodiment of the disclosure may be implemented by using hardware only, by using software, and a necessary universal hardware platform. The disclosure may be implemented in the form of a procedure, function, module, etc. that implements the functions or operations described above. Based on such understandings, the technical solution of the disclosure may be embodied in the form of software. The software may be stored in a non-volatile or non-transitory storage medium/module, which may be a compact disk read-only memory (CD-ROM), USB flash disk, or a removable hard disk or a cloud environment. For example, such execution may correspond to a simulation of the logical operations as described herein. The software product may additionally or alternatively include a number of instructions that enable a computing device to execute operations for configuring or programming a digital logic apparatus in accordance with embodiments of the disclosure.

In an example, natural language processing (NLP)/ML mechanism and VPA simulations underlying the architecture 1300 may be remotely accessible and cloud-based, thereby being remotely accessible through a network connection. A computing device such as a VPA device may be configured for remotely accessing the NLP/ML modules and simulation modules may comprise skeleton elements such as a microphone, a camera a screen/monitor, a speaker etc.

Further, at least one of the plurality of modules may be implemented through AI based on ML/NLP logic. A function associated with AI may be performed through the non-volatile memory, the volatile memory, and the processor constituting the first hardware module, e.g., specialized hardware for ML/NLP based mechanisms. The processor may include one or a plurality of processors. At this time, one or a plurality of processors may be a general purpose processor, such as a central processing unit (CPU), an application processor (AP), or the like, a graphics-only processing unit such as a graphics processing unit (GPU), a visual processing unit (VPU), and/or an AI-dedicated processor such as a neural processing unit (NPU). The aforesaid processors collectively correspond to the processor.

The one or a plurality of processors control the processing of the input data in accordance with a predefined operating rule or artificial intelligence (AI) model stored in the non-volatile memory and the volatile memory. The predefined operating rule or artificial intelligence model is provided through training or learning.

Here, being provided through learning means that, by applying a learning logic/technique to a plurality of learning data, a predefined operating rule or AI model of a desired characteristic is made. The learning may be performed in a device itself in which AI according to an embodiment is performed, and/or may be implemented through a separate server/system.

The AI model may consist of a plurality of neural network layers. Each layer has a plurality of weight values, and performs a layer operation through calculation of a previous-layer and an operation of a plurality of weights. Examples of neural-networks include, but are not limited to, convolutional neural network (CNN), deep neural network (DNN), recurrent neural network (RNN), restricted Boltzmann Machine (RBM), deep belief network (DBN), bidirectional recurrent deep neural network (BRDNN), generative adversarial networks (GAN), and deep Q-networks.

The ML/NLP logic is a method for training a predetermined target device (for example, a robot) using a plurality of learning data to cause, allow, or control the target device to make a determination or prediction. Examples of learning techniques include, but are not limited to, supervised learning, unsupervised learning, semi-supervised learning, or reinforcement learning.

The disclosure at least enables automatic selection of markers. Markers may be automatically selected based on both textual description (user manual, story book etc) and visual objects in the scene. Further, the disclosure enables automatic selection of responses: While markers in scene are automatically extracted, actions on each marker may be simultaneously identified and form meta information which may be updated in global image for quick retrieval.

At least one of the components, elements, modules or units (collectively "components" in this paragraph) represented by a block in the drawings may be embodied as various numbers of hardware, software and/or firmware structures that execute respective functions described above, according to an example embodiment. According to example embodiments, at least one of these components may use a direct circuit structure, such as a memory, a processor, a logic circuit, a look-up table, etc. that may execute the respective functions through controls of one or more microprocessors or other control apparatuses. Also, at least one of these components may be specifically embodied by a module, a program, or a part of code, which contains one or more executable instructions for performing specified logic functions, and executed by one or more microprocessors or other control apparatuses. Further, at least one of these components may include or may be implemented by a processor such as a central processing unit (CPU) that performs the respective functions, a microprocessor, or the like. Two or more of these components may be combined into one single component which performs all operations or functions of the combined two or more components. Also, at least part of functions of at least one of these components may be performed by another of these components. Functional aspects of the above exemplary embodiments may be implemented in algorithms that execute on one or more processors. Furthermore, the components represented by a block or processing steps may employ any number of related art techniques for electronics configuration, signal processing and/or control, data processing and the like.

Unless otherwise defined, all technical and scientific terms used herein have the same meaning as commonly understood by one of ordinary skilled in the art to which this disclosure belongs. The system, methods, and examples provided herein are illustrative only and not intended to be limiting.

While specific language has been used to describe the disclosure, any limitations arising on account thereto, are not intended. As would be apparent to a person in the art, various working modifications may be made to the method in order to implement the inventive concept as taught herein. The drawings and the foregoing description provide examples of embodiments. Those skilled in the art will appreciate that one or more of the described elements may be combined into a single functional element. Alternatively, certain elements may be split into multiple functional elements. Elements from one embodiment may be added to another embodiment.

The invention claimed is:

1. A method for selecting a marker to be included in a scene provided in an augmented reality (AR) environment, the method comprising:
   receiving an image in the AR environment;
   extracting one or more region of interests (ROIs) from the received image based on an artificial neural network (ANN);
   identifying a text within the one or more ROIs or from at least one document associated with the one or more ROIs;
   determining one or more phrase-action pairs from the identified text;
   calculating inter-modal similarity between the one or more ROIs and the one or more phrase-action pairs to generate a set of phrase-action-ROI tuples, wherein each tuple of the set of phrase-action-ROI tuples comprises a phrase-action pair and at least one ROI;
   computing intra-modal similarity with respect to each tuple of the set of phrase-action-ROI tuples based on a comparison between at least one of:
     (a) the phrase-action pair and a text corresponding to the at least one ROI; or
     (b) the at least one ROI and an image corresponding to the phrase-action pair;
   selecting one or more phrase-action-ROI tuples of the set of phrase-action-ROI tuples as a marker for the received image, the selecting being based on the computed intra-modal similarity being above a threshold; and
   updating a scene provided in the AR environment based on the selected one or more phrase action-ROI tuples.

2. The method as claimed in claim 1, wherein the determining the one or more phrase-action pairs further comprises:
   transforming phrase and action embedding for each of the one or more determined phrase-action pairs into vectors corresponding to a same vector space;
   determining a causal-relationship amongst the vectors for each of the determined phrase-action pairs; and
   determining first shortlisted one or more phrase-action pairs from the determined phrase-actions pairs based on a magnitude of the causal-relationship.

3. The method as claimed in claim 2, wherein the calculating the inter-modal similarity comprises:
   generating one or more representations for the first shortlisted one or more phrase-action pairs by generating vectors for the first shortlisted one or more phrase-action pairs, the one or more representations corresponding to a common embedding space; and
   calculating inter-modal similarity between the one or more ROIs and the first shortlisted one or more phrase-action pairs within the common embedding space.

4. The method as claimed in claim 3, wherein the calculating the inter-modal similarity within the common embedding space comprises:
   concatenating the one or more representations of the first shortlisted one or more phrase-action pairs with one or more representations representation for the one or more ROIs;
   quantifying a relationship based on the concatenating in terms of a first score;
   selecting second shortlisted one or more phrase-action pairs from the first shortlisted one or more phrase-action pairs based on a thresholding of the first score;
   calculating a second score of each ROI of the one or more ROIs;

creating shortlisted one or more ROIs from the one or more ROIs to be associated with each phrase-action pair in the second shortlisted one or more phrase action-pairs based on a thresholding of the second score; and
generating the set of phrase-action-ROI tuples, each phrase-action-ROI tuple comprising:
a) a phrase-action pair from the second shortlisted one or more phrase-action pairs; and
b) at least one ROI from the shortlisted one or more ROIs.

5. The method as claimed in claim 3, wherein, for each phrase-action pair within the second shortlisted one or more phrase action pairs,
a number (M) of the shortlisted one or more ROIs is equal to or less than a number (N) of the one or more ROIs associated with each phrase-action pair within the first shortlisted one or more phrase-action pairs.

6. The method as claimed in claim 5, wherein the calculating the intra-modal similarity comprises with respect to each tuple in the set of phrase-action-ROI tuples, performing one or more of:
generating an image from a phrase-action pair of a tuple and computing a first similarity between the generated image and the at least one ROI associated with the phrase action pair in the tuple;
generating a text from the at least one ROI in the tuple and computing a second similarity between the generated text and the phrase-action pair within the tuple;
summing the first similarity with the second similarity to calculate an overall similarity score for each tuple in the set of phrase-action-ROI tuples; and
selecting one or more tuples from the set of phrase-action-ROI tuples as the marker for the received image based on thresholding of the overall similarity score.

7. The method as claimed in claim 1, wherein the image corresponding to the at least one ROI of a tuple includes an image of an ROI generated from a phrase-action pair within the tuple, and
wherein the text corresponding to the at least one ROI of a tuple includes a text that defines a phrase-action pair within each ROI of the one or more ROIs.

8. An apparatus for diagnosing malfunctioning in a device based on imaging in an augmented reality (AR) environment, the apparatus being provided in a system on chip (SoC) or a distributed computing system, the apparatus comprising:
an imaging sensor configured to receive an image of a malfunctioning device;
one or more processor configured to:
execute one or more instructions of an artificial neural network (ANN) to extract one or more region of interests (ROIs) from the received image,
execute one or more instructions of a natural language processing (NLP) module to identify a text within the one or more ROIs or from at least one document associated with the one or more ROIs, determine one or more phrase-action pairs from the identified text,
execute one or more instructions of a visual-linguistic transformer module to calculate inter-modal similarity between the one or more ROIs and the one or more phrase-action pairs to generate a set of phrase-action-ROI tuples, wherein each tuple of the set of phrase-action-ROI tuples comprises a phrase-action pair and at least one ROI, compute intra-modal similarity with respect to each tuple of the set of phrase-action-ROI tuples based on a comparison between at least one of:
(a) the phrase-action pair and a text corresponding to the at least one ROI;
or
(b) the at least one ROI and an image corresponding to the phrase-action pair; and
select one or more phrase-action-ROI tuples of the set of phrase-action-ROI tuples as a marker for the received image, selection being based the computed intra-modal similarity being above a threshold,
execute one or more instructions of an augmented reality (AR) engine to visibly highlight the marker within the received image to indicate information related to a malfunction of the malfunctioning device; and
a display configured to render the received image and the highlighted marker on the received image.

9. The apparatus as claimed in claim 8, wherein the one or more processor is further configured to execute the one or more instructions of the augmented reality (AR) engine to:
determine at least one AR object by accessing an index of AR object from an AR resource database; and
incorporate the at least one AR object at a location at or around the marker;
control the display to display one or more of:
a text message or symbol related to cause of the malfunction;
a location of the malfunction;
a symbolic recommendation to overcome the malfunction;
a text recommendation to overcome the malfunction; and
a text message for a user.

10. The apparatus as claimed in claim 8, wherein the one or more processor is further configured to execute the one or more instructions of the augmented reality (AR) engine to orient a display of the at least one AR object and the marker based on an aspect ratio or a size of the display.

11. The apparatus as claimed in claim 8, wherein the ANN is defined by an image processor and is the image processor is configured to:
detect a plurality of objects as the one or more ROIs within the image by using an object detection technique; and
generate a vector for each ROI of the one or more ROIs as a representation for each ROI.

12. The apparatus as claimed in claim 8, wherein the NLP is defined by a text processor and the text processor is configured to:
transform phrase and action embedding for each of the one or more determined phrase-action pairs into vectors corresponding to a same vector space;
determine a causal-relationship amongst the vectors for each of the determined phrase-action pairs; and
determine first shortlisted one or more phrase-action pairs from the determined phrase-actions pairs based on a magnitude of the causal-relationship.

13. The apparatus as claimed in claim 12, wherein the visual-linguistic transformer module comprises an inter-modal module and the one or more processor is further configured to execute the one or more instructions of the visual-linguistic transformer module to calculate the inter-modal similarity by performing:
generating one or more representations for the first shortlisted one or more phrase-action pairs by generating vectors for the first shortlisted one or more phrase-action pairs, the one or more representations corresponding to a common embedding space; and calculating inter modal similarity between the one or more ROIs and the first shortlisted one or more phrase-action pairs within the common embedding space.

14. The apparatus as claimed in claim 13, wherein the one or more processor is further configured to execute the one or more instructions of the inter-modal module to calculate the inter-modal similarity by performing:

concatenating the representation of the first shortlisted one or more phrase-action pairs with the representation for the one or more ROIs;

quantifying a relationship based on the concatenating in terms of a first score;

selecting second shortlisted one or more phrase-action pairs from the first shortlisted one or more phrase-action pairs based on a thresholding of the first score;

calculating a second score of each ROI of the one or more ROIs;

creating shortlisted one or more ROIs from the one or more ROIs to be associated with each phrase-action pair in the second shortlisted one or more phrase action-pairs based on a thresholding of the second score; and generating the set of phrase-action-ROI tuples, each phrase-action-ROI tuple comprising:

a) a phrase-action pair from the second shortlisted one or more phrase-action pairs; and b) at least one ROI from the shortlisted one or more ROIs.

15. The apparatus as claimed in claim 14, wherein the visual-linguistic transformer module comprises an intra-modal module and the one or more processor is further configured to execute the one or more instructions of the visual-linguistic transformer module to, with respect to each tuple in the set of phrase-action-ROI tuples, perform one or more of:

generating an image from a phrase-action pair of a tuple and computing a first similarity between the generated image and the at least one ROI associated with the phrase action pair in the tuple;

generating a text from the at least one ROI in the tuple and computing a second similarity between the generated text and the phrase-action pair within the tuple;

summing the first similarity with the second similarity to calculate an overall similarity score for each tuple in the set of phrase-action-ROI tuples; and selecting one or more tuples from the set of phrase-action-ROI tuples as the marker for the received image based on thresholding of the overall similarity score.

* * * * *